United States Patent
Tian et al.

(10) Patent No.: US 10,386,808 B2
(45) Date of Patent: Aug. 20, 2019

(54) SYSTEM PARAMETER IDENTIFICATINO METHOD BASED ON RATE-LIMITED RELAY WITH HYSTERESIS AND SINUSOIDAL INJECTION

(71) Applicant: LINESTREAM TECHNOLOGIES, Cleveland, OH (US)

(72) Inventors: Gang Tian, Westlake, OH (US); Adam Reynolds, Shaker Heights, OH (US)

(73) Assignee: DANFOSS POWER ELECTRONICS A/S, Grasten (DK)

( * ) Notice: Subject to any disclaimer, the term of this patent is extended or adjusted under 35 U.S.C. 154(b) by 356 days.

(21) Appl. No.: 15/441,482

(22) Filed: Feb. 24, 2017

(65) Prior Publication Data

US 2018/0246482 A1    Aug. 30, 2018

(51) Int. Cl.
*G05B 19/04* (2006.01)
*G05B 19/042* (2006.01)
*G06F 17/18* (2006.01)

(52) U.S. Cl.
CPC .. *G05B 19/042* (2013.01); *G05B 2219/37181* (2013.01)

(58) Field of Classification Search
CPC ........ G05B 19/042; G05B 2219/37181; G05B 2219/41025; G06F 1/022; G06F 1/025; G06F 1/0321; G06F 17/18; G06F 19/402; G06F 19/404
USPC ......................................................... 700/37
See application file for complete search history.

(56) References Cited

U.S. PATENT DOCUMENTS

| | | |
|---|---|---|
| 4,549,123 A | 10/1985 | Hagglund et al. |
| 5,742,503 A | 4/1998 | Yu |
| 6,005,315 A | 12/1999 | Chapman |
| 6,081,751 A * | 6/2000 | Luo .................. G05B 11/42 700/39 |
| 6,697,767 B2 | 2/2004 | Wang et al. |
| 7,035,695 B2 | 4/2006 | Boiko |
| 8,041,436 B2 | 10/2011 | Gao |

(Continued)

OTHER PUBLICATIONS

International Search Report & Written Opinion for PCT Application Serial No. PCT/US2018/019100, dated May 16, 2018, 16 pages.

(Continued)

*Primary Examiner* — Michael J Brown
(74) *Attorney, Agent, or Firm* — Amin, Turocy & Watson LLP

(57) ABSTRACT

A system parameter identification system uses a combination of relay control and sinusoidal injection to derive accurate estimates of system parameters of a controlled system or process while satisfying the rate-limit associated with some control applications. The system uses rate-limited relay control with hysteresis to place the system in oscillation. The system then switches the control signal from relay-based control to open-loop sinusoidal control using oscillation frequency, amplitude, and phase information obtained during the relay control stage. During the sinusoidal control phase, the plant output passes through a bandpass filter at the oscillation frequency to get a clean sinusoidal signal. The phase difference between the input and output signals and the output/input amplitude ratio are then obtained and used to calculate of the system parameters.

20 Claims, 24 Drawing Sheets

(56) References Cited

U.S. PATENT DOCUMENTS

| | | |
|---|---|---|
| 8,060,340 B2 | 11/2011 | Gao et al. |
| 8,710,777 B2 | 4/2014 | Tian |
| 9,041,337 B2 | 5/2015 | Tian |
| 2005/0143846 A1 | 6/2005 | Kocher et al. |
| 2014/0379102 A1 | 12/2014 | Tian et al. |
| 2015/0175139 A1 | 6/2015 | Eberling et al. |
| 2016/0033944 A1 | 2/2016 | Ei-Shaer et al. |
| 2016/0094628 A1 | 3/2016 | Husain et al. |
| 2016/0209816 A1 | 7/2016 | Neundorfer |
| 2016/0276966 A1 | 9/2016 | Tian |

OTHER PUBLICATIONS

Astrom et al., Automatic Tuning of Simple Regulators with Specifications on Phase and Amplitude Margins, Automatica, vol. 10, No. 5, pp. 645-651, 1984.

Lina, et al. "PI controller relay auto-tuning using delay and phase margin in PMSM drives", Chinese Journal of Aeronautics, 2014, pp. 1527-1537.

Soltesz, et al. "Transfer Function Parameter Identification by Modified Relay Feedback", American Control Conference, 2010.

Astrom, et al. "Automatic Tuning and Adaptation for PID Controllers—A Survey", Control Engineering Practice, vol. 1, No. 4, 1993, pp. 699-714.

Tsang, et al. "Frequency Response Testing and Low-Order Modelling by Relay Oscillation Method", HKIE Transactions, 2013.

Wang, et al. "Relay Feedback: Analysis, Identification and Control," Springer, 2003.

\* cited by examiner

STAGE 1: DETERMINE RELAY CONTROL PARAMETERS

STAGE 2: RELAY-BASED CONTROL

SYSTEM PARAMETER IDENTIFICATINO METHOD BASED ON RATE-LIMITED RELAY WITH HYSTERESIS AND SINUSOIDAL INJECTION

TECHNICAL FIELD

This disclosure generally relates to control systems, and, more specifically, to estimation of system parameters of controlled systems and processes.

BACKGROUND

Many automation applications employ closed-loop control systems to control mechanical motion systems or industrial processes. Motion control systems typically include one or more motors or other motion devices operating under the guidance of a controller, which sends position or speed control instructions to the motor in accordance with a user-defined control algorithm. Some motion control systems operate in a closed-loop configuration, whereby the controller instructs the motor to move to a target position or to transition to a target velocity (a desired state) and receives feedback information indicating an actual state of the motor. The controller monitors the feedback information to determine whether the motor has reached the target position or velocity, and adjusts the control signal to correct errors between the actual state and the desired state.

Similar control techniques are also used in process control applications. In the case of process control applications, the control signal generated by the controller regulates one or more process variables in accordance with a control algorithm, and a measured value of the process variable is provided to the controller as feedback data, allowing the controller to adjust the control signal as needed based on the actual value of the process variable relative to a desired setpoint.

Designers of motion control and process control systems seek to achieve an optimal trade-off between performance and system stability. For example, an aggressively tuned controller may result in a system that tracks a desired position or setpoint with high accuracy and a fast response time, but may be rendered unstable in the presence of system noise and uncertainties. Alternatively, tuning the controller more conservatively will improve system stability, but at the expense of performance. Ideally, the controller gain coefficients should be selected to optimize this trade-off between performance and system stability. The process of selecting suitable gain coefficients for the controller is known as tuning.

Tuning the gain coefficients for a controller determines the controller's bandwidth, which is a measure of responsiveness of the controlled system to changes in the control signal. The response of the controlled system to a signal from a controller is partially a function of the controller's bandwidth and the physical characteristics of the controlled system (e.g., inertia, damping, friction, coupling stiffness, phase lag, etc.). In general, higher controller bandwidths will result in faster output response to control signals, better disturbance rejection, and smaller tracking error. However, setting the bandwidth too high can introduce system instability by rendering the system more sensitive to noise and reducing closed-loop robustness (the ability of the system to remain stable over a range of reasonable system uncertainties and disturbances), particularly in the presence of inherently uncertain motor-load dynamics. For example, for lightly damped motion systems, excessively high controller bandwidth can over-excite the system resulting in undesirable oscillations, which in turn may cause controller saturation as the controller attempts to stabilize the resulting oscillations. The system can be rendered more stable by reducing the controller bandwidth, but at the expense of performance. For at least these reasons, tuning parameters for a given motion control system must be carefully selected to achieve robust performance and robust stability.

Adding to these difficulties in achieving optimal controller tuning, some mechanical systems or processes are designed such that there is a considerable delay—known as dead time—between issuance of a control command by the controller and a corresponding system response. Systems with high dead time or phase lag often experience undesirable oscillations in response to disturbances or setpoint changes, resulting in degraded performance and rendering the tuning of such systems more difficult.

The above-described is merely intended to provide an overview of some of the challenges facing conventional motion control systems. Other challenges with conventional systems and contrasting benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

One or more embodiments of the present disclosure relate to systems and methods for accurately estimating system parameters of a controlled system or process with dead time and a rate limit on the control signal. According to one or more embodiments, both relay-based control and open-loop sinusoidal injection control are applied to the controlled system or process. In particular, rate-limited relay-based control with hysteresis is used to bring the system into oscillation. Rate-limiting the output of the relay-based control ensures that the rate limit of the control application is satisfied. When the system is in oscillation, control switches from relay-based control to open-loop sinusoidal signal injection control, where the sinusoidal control signal is configured to have a phase that substantially aligns with the phase of the relay-based control output. The plant output signal resulting from the sinusoidal control signal is band-pass filtered to obtain a relatively clean signal, and the system parameters are derived based on the phase difference between the control signal and the filtered output signal as well as the amplitude ratio between the output and control signals. This technique can yield accurate system parameter estimates without the need to derive complicated describing functions relating the critical gain to the signal amplitude.

The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
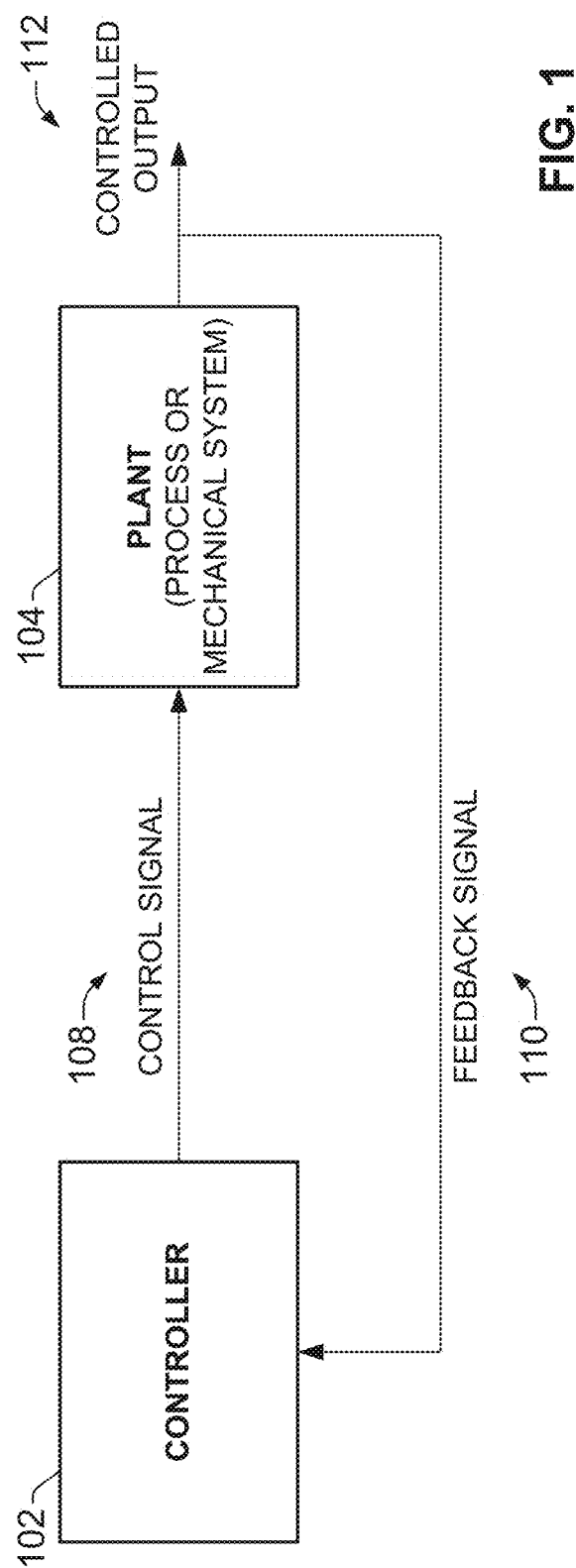
FIG. 1 is a simplified diagram of a closed-loop control architecture.

Various embodiments are now described with reference to the drawings, wherein like reference numerals refer to like elements throughout. In the following description, for the purposes of explanation, numerous specific details are set forth in order to provide an understanding of this disclosure. It is to be understood, however, that such embodiments may be practiced without these specific details, or with other methods, components, materials, etc. In other instances, structures and devices are shown in block diagram form to facilitate describing one or more embodiments.

Systems and methods described herein relate to techniques for determining system parameters of a controlled system that includes dead time. Accurate estimates of the system parameters that characterize a mechanical system or industrial process—e.g., system gain, time constant(s), and dead time—can simplify the control system tuning process and assist a designer in selecting suitable tuning parameters that will yield accurate robust control. In one or more embodiments, a parameter identification system uses rate-limited relay control with hysteresis to lead the system into oscillation, and obtains the oscillation frequency as a result of the relay control. The system then changes the actuation signal from a relay signal to an open-loop sinusoidal control signal using the obtained relay oscillation frequency to ensure that the phase of the sinusoidal signal substantially aligns with the phase of the relay control signal. The output of the controlled system is bandpass filtered in order to produce a clean sinusoidal signal. The phase difference between the control signal (input) and controlled variable (output) and the output/input amplitude ratio resulting from the sinusoidal control signal are obtained and used to determine the system parameters (e.g., gain, time constant, and dead time) of the controlled mechanical system or process.

This parameter estimation technique is also suitable for use with control systems having a rate limit on the actuation (control) signal. The maximum changing rate of the sinusoidal signal occurs at the zero-cross point, and the rate is the sinusoidal frequency. To ensure that a rate limit of the control system's actuator signal remains satisfied during the parameter identification process, the sinusoidal signal amplitude can be configured to satisfy a rate limit of the actuator.

FIG. 1 is a simplified diagram of a closed-loop control architecture. Controller 102 is programmed to control plant 104, which can be a mechanical system (e.g., a motor that drives a mechanical load) or an industrial process in which one or more process variables are regulated by the controller 102 in accordance with a control algorithm. In an example mechanical application, plant 104 may comprise a motor-driven industrial automation application or industrial tool, including but not limited to a machining or material handling robot, a conveyor, a tooling machine, a motorized hand tool, etc. Plant 104 may also comprise a motor-driven traction and/or propulsion system of an electric vehicle design, including but not limited to an electric or hybrid electric automobile, a bicycle, a forklift or other industrial vehicle, a scooter, a railway vehicle such as a train, or other such vehicles. Plant 104 may also be a series of fans and/or pumps that are part of an HVAC (heating, ventilating, and air conditioning) system, where the speed of the motors and/or pumps is controlled by controller 102. Plant 104 may also be a motor-driven home or industrial appliance. For example, controller 102 may be used to control a motor that drives the drum of a home or industrial washing machine, to control the spinning of a centrifuge, or to control the motion of other such appliances. These example control systems are not intended to be exhaustive; rather, plant 104 can comprise substantially any type of mechanical motion system or industrial process.

Controller 102 and plant 104 make up the primary components of an example closed-loop control system. In an example mechanical application, plant 104 can represent a motor-driven axis of a single- or multi-axis robot or positioning system. In such applications, controller 102 sends control signal (or actuating signal) 108 instructing the motor to move the mechanical load to a desired position at a desired speed. The control signal 108 can be provided directly to the motor, or to a motor drive (not shown) that controls the power delivered to the motor (and consequently the speed and direction of the motor). Feedback signal 110 indicates a current state (e.g., position, velocity, etc.) of the motor and/or mechanical load in substantially real-time. In servo-driven systems, feedback signal 110 can be generated, for example, by an encoder or resolver (not shown) that tracks an absolute or relative position of the motor. In sensorless systems lacking a velocity sensor, the feedback signal can be provided by a speed/position estimator. In this example, the controlled output 112 of the plant 104—which the feedback signal 110 measures—represents the position of the load (in speed control applications, the controlled output 112 will be the velocity). During a move operation, the controller monitors feedback signal 110 to ensure that the load has accurately reached the target position. The controller 102 compares the actual position of the load as indicated by the feedback signal 110 with the target position, and adjusts the control signal 108 as needed to reduce or eliminate error between the actual and target positions.

In another example application, plant 104 can represent a spinning load (e.g., a pump, a washing machine, a centrifuge, etc.) driven by a motor, in which controller 102 controls the rotational velocity of the load. In this example, controller 102 provides an instruction to the motor (via control signal 108) to transition from a first velocity to a second velocity, and makes necessary adjustments to the control signal 108 based on feedback signal 110 (in this example, the controlled output 112 of plant 104 is the velocity).

It is to be appreciated that the system parameter identification techniques of the present disclosure are not limited to use with the example types of control systems described above, but rather are applicable to substantially any type of motion control or industrial process application.

Selecting suitable tuning parameters for controller 102 that achieve robust stability and performance can be simplified if system parameters that characterize plant 104—that is, the parameters of the transfer function of the plant model—are known. However, estimating the parameters of a system that has dead time (a lag or delay between the control signal issued by the controller and the output variable response) can be challenging. In some cases, a noise injection and a fast Fourier transform (FFT) manipulation approach can be applied to get the Bode plot of the system, and to then apply curve fitting to obtain the parameters of the plant's transfer function. However, algorithms required to implement this approach create a high calculation burden, making the algorithms impractical for deployment in a motor drive or controller. Moreover, some control applications are designed with a rate limit on the control (actuator) signal 108, such that a limit is placed on the rate of change of the control signal 108. For such applications, a noise signal cannot be passed into the system, since the frequency of the noise may exceed a level that can be supported by the rate-limited control signal.

Sinusoidal signal sweeping is another approach that can be used to identify system parameters. However, there are difficulties associated with this approach when applied to systems having dead time. For example, because the delay associated with the dead time will result in phase shift between the control signal and the output of the plant (e.g., the controlled process variable, the speed or position of a mechanical system, etc.), if the delay is greater than the sinusoidal period, the measured phase can reflect phase roll-over resulting from the delay, producing a wrong delay estimate.

Figure 2:
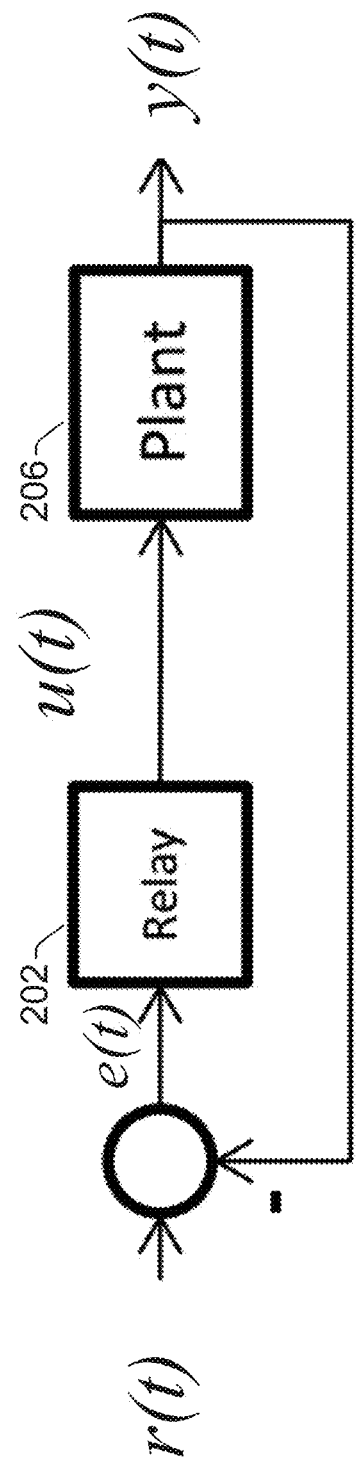
FIG. 2 is a block diagram of an example relay-based system parameter identification system.

Relay-based identification is an approach for identifying the critical frequency and critical gain of a controlled system. This approach was proposed by Åström and Hägglunds to improve the Ziegler-Nichols frequency tuning approach. FIG. 2 is a block diagram of an example relay-based system parameter identification system. In order to avoid unstable manual adjustment of proportional gain in the Ziegler-Nichols frequency tuning method, a relay 202 (e.g., a computational component that produces a step-like on-off output based on the input signal provided to the relay 202) is inserted in the unit feedback loop so that the system will oscillate close to the critical frequency. During the testing sequence, the relay 202 replaces the normal control block of the control system, so that the control signal u(t) to the plant is controlled solely by the relay 202. In this example, during a parameter identification sequence, the control system generates a reference signal r(t), which may be a step test signal. The input to the relay 202 is the error e(t) between the reference signal r(t) and the plant output y(t) (where the plant output y(t) is the value of the controlled system variable).

Figure 3:
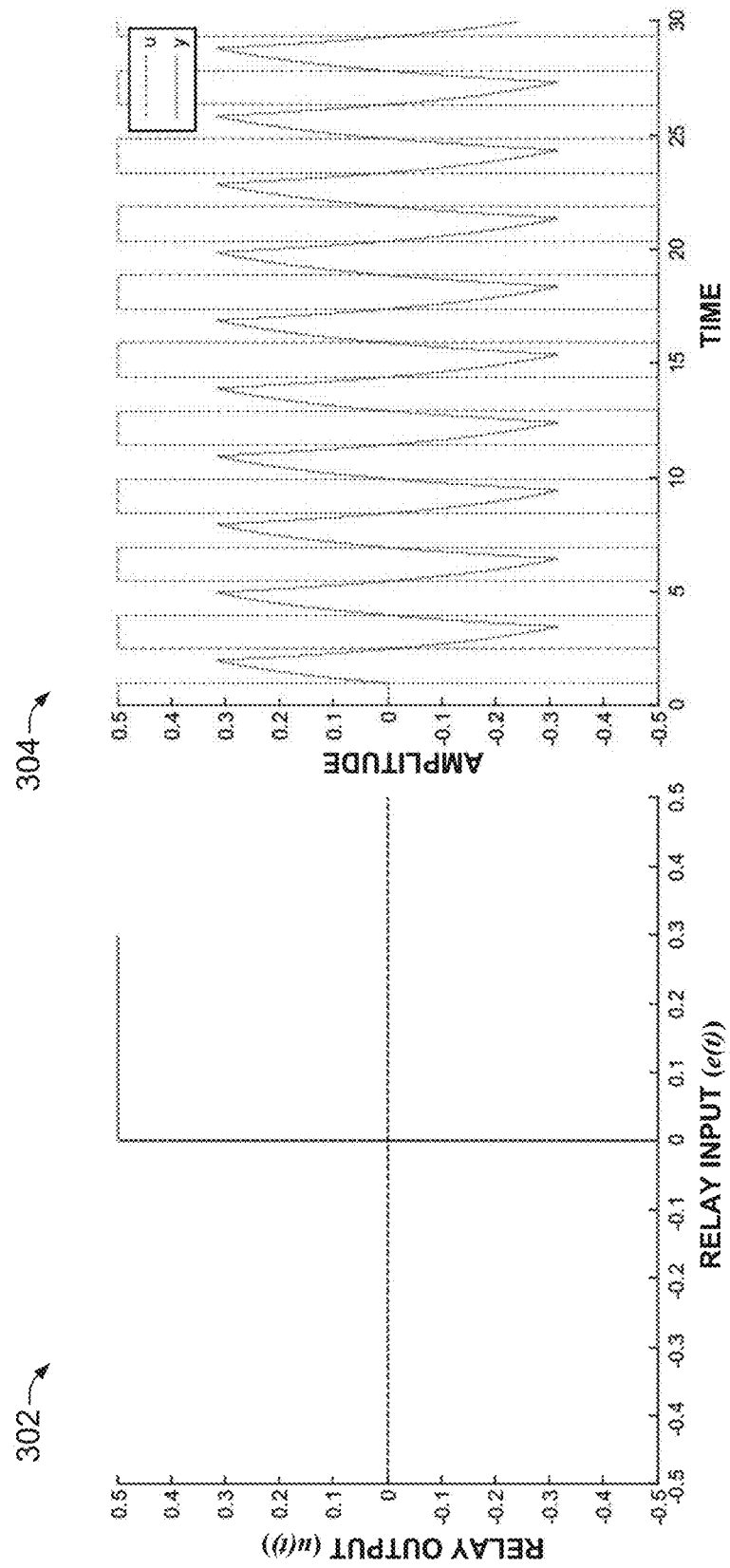
FIG. 3 is a pair of graphs illustrating the relationship between the plant input and output for switch relay control with no hysteresis.

FIG. 3 is a pair of graphs 302 and 304 illustrating the relationship between the plant input u(t) and output y(t) for switch relay control with no hysteresis. Graph 302 plots the relay output (control signal u(t)) as a function of the relay input (error e(t)). With no hysteresis, the relay output turns on when the error e(t) is positive, and turns off when the error e(t) is negative (the limit on the relay output is set to 0.5 in this example). Graph 304 plots the resulting control signal u(t) (the dashed line) together with the plant output y(t) (the solid line).

Figure 4:
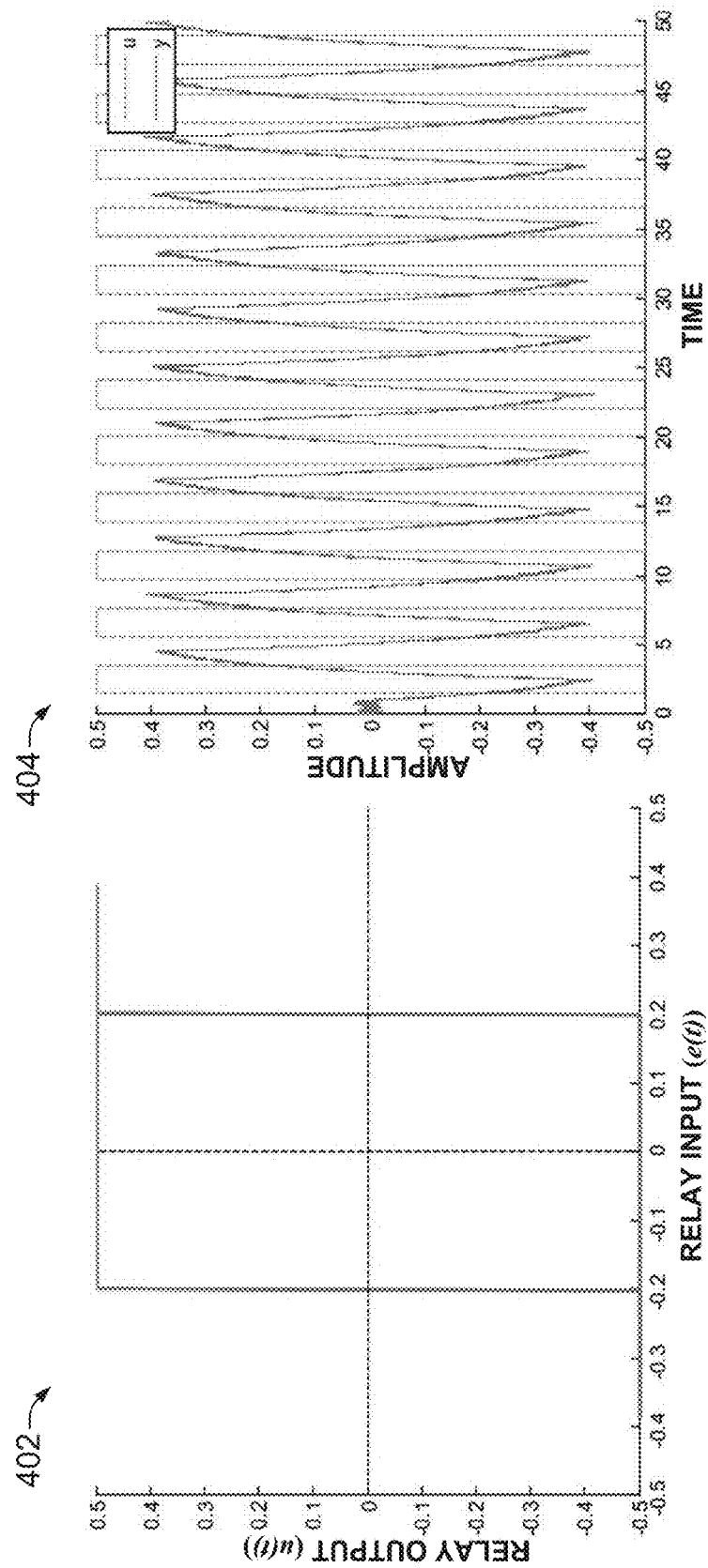
FIG. 4 is a pair of graphs illustrating the relationship between the plant input and output for switch relay control with hysteresis.

To tolerate noise, hysteresis can be included in the relay 202. FIG. 4 is a pair of graphs 402 and 404 illustrating the relationship between the plant input u(t) and plant output y(t) for switch relay control with hysteresis. As shown in graph 402, with the hysteresis band set to 0.2, the relay output u(t) turns on when the error e(t) exceeds 0.2, and turns off when error e(t) drops below −0.2. The resulting control signal u(t) is plotted together with the plant output y(t) in graph 404.

Based on the plant input and output data illustrated in graph 404, the relationship between the measured ratio—that is, the ratio between the peak of the system output y(t) and the magnitude of the relay output signal u(t)—and the critical gain at the critical frequency can be obtained. This approach can determine the frequency and the approximated gain at a critical point on the Nyquist plot, and the system parameters for a given plant model can be derived from this critical gain and frequency.

However, the identified critical gain values obtained using this approach can deviate considerably from the actual gain values in some cases. This is due in part to the fact that the actual feedback signal y(t) is often far from the assumed sinusoidal signal (see, e.g., the plots of y(t) in graphs 304 and 404). The derived parameters can deviate even further from the actual parameters for systems in which the dead time is much larger than the system time constant.

To address these and other issues, one or more embodiments described herein provide a system parameter identification system and method that uses a combination of relay control and sinusoidal injection control to derive system parameters. The techniques described herein can accurately identify system parameters for systems with a known plant model, and can overcome difficulties associated with parameter identification for applications with a rate limit on the control signal.

In one or more embodiments, the parameter identification system uses rate-limited relay control with hysteresis to lead the system into oscillation. The system then switches the control signal from relay control to open loop sinusoidal control using oscillation frequency, amplitude, and phase information obtained during the relay control stage. During the sinusoidal control stage, the plant output passes through a bandpass filter at the oscillation frequency to suppress noise and get a relatively smooth sinusoidal signal. The phase difference between the input and output and the output/input amplitude ratio are then obtained and used in the calculation of the system parameters.

The maximum changing rate of the sinusoidal signal happens at the zero-cross point, and the rate is the sinusoidal frequency. Therefore, the sinusoidal signal amplitude can be configured to satisfy the control signal rate limit of the system being measured.

Figure 5:
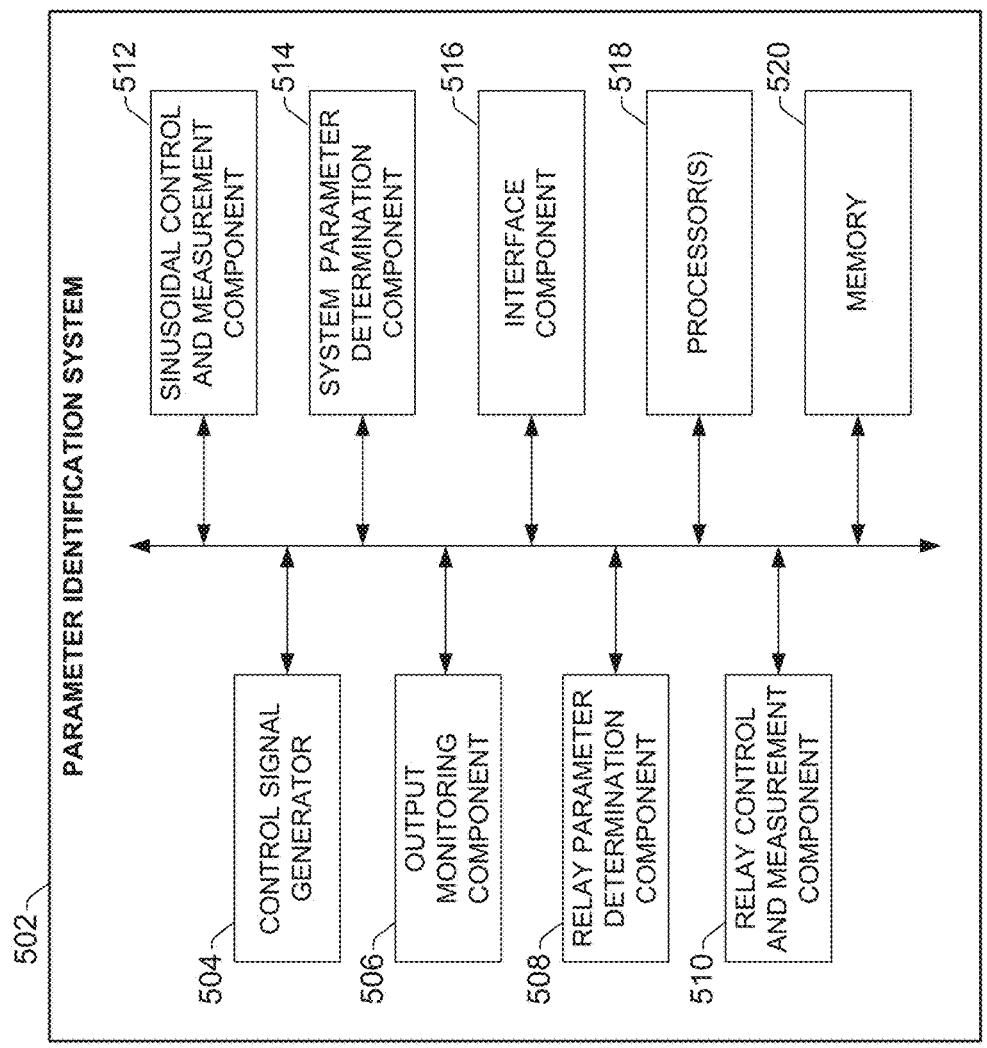
FIG. 5 is a block diagram of an example parameter identification system capable of generating estimated system parameter values for a controlled mechanical system or industrial process.

FIG. 5 is a block diagram of an example parameter identification system 502 capable of generating estimated system parameter values for a controlled mechanical system or industrial process. Parameter identification system 502 can include a control signal generator 504, an output monitoring component 506, a relay parameter determination component 508, a relay control and measurement component 510, a sinusoidal control and measurement component 512, a system parameter determination component 514, an interface component 516, one or more processors 518, and memory 520. In various embodiments, one or more of the control signal generator 504, output monitoring component 506, relay parameter determination component 508, relay control and measurement component 510, sinusoidal control and measurement component 512, system parameter determination component 514, interface component 516, the one or more processors 518, and memory 520 can be electrically and/or communicatively coupled to one another to perform one or more of the functions of the parameter identification system 502. In some embodiments, components 504, 506, 508, 510, 512, 514, and 516 can comprise software instructions stored on memory 520 and executed by processor(s) 518. The parameter identification system 502 may also interact with other hardware and/or software components not depicted in FIG. 5. For example, processor(s) 518 may interact with one or more external user interface device, such as a keyboard, a mouse, a display monitor, a touchscreen, or other such interface devices.

Control signal generator 504 can be configured to generate and output a control signal (e.g., an analog voltage signal such as a 0-10 VDC signal, an analog current signal such as a 4-20 mA signal, a digital signal, a software instruction, or any other suitable type of control signal) in accordance with defined testing routines. Output monitoring component 506 can be configured to receive and measure feedback data from a controlled system representing an output value of a parameter being controlled (e.g., a speed or position of a motion system, a process variable of an industrial process, etc.) in response to the control signal.

Relay parameter determination component 508 can be configured to instruct the control signal generator 504 to control the control signal in accordance with a relay configuration determination sequence, and to determine one or more relay configuration parameters for a relay-based control stage of a system parameter identification sequence. Relay control and measurement component 510 can be configured to execute the relay-based control stage of the system parameter identification sequence (e.g., by instructing the control signal generator 504 to control the control signal in accordance with rate-limited relay-based control), and to determine an oscillation frequency and a sinusoidal signal amplitude based on data collected during the relay-based control stage.

Sinusoidal control and measurement component 512 can be configured to execute a sinusoidal signal injection stage of the system parameter identification sequence (e.g., by instructing the control signal generator 504 to set the control signal to be a sinusoidal signal), and to determine a phase difference and an amplitude ratio based on data collected during the sinusoidal signal injection stage. System parameter determination component 514 can be configured to determine one or more system parameters for the controlled system (plant) based on results of the relay-based control and sinusoidal signal injection stages. For example, system parameter determination component 514 can determine a gain, one or more time constants (depending on the plant model), and a dead time of the system based on oscillation frequency and amplitude ratio information obtained during the relay-based control and sinusoidal signal injection phases.

Interface component 516 can be configured to receive user input and to render output to the user in any suitable format (e.g., visual, audio, tactile, etc.). User input can be, for example, user-defined parameters used by the parameter identification system 502 when executing the system parameter identification sequence (e.g., identification of a plant model, noise tolerance parameters, rate limit definitions, etc.). Outputs rendered by the interface component 516 can include, but are not limited to, values of the obtained system parameters, graphs of the control signal and/or the controlled system or process variable over time, or other such outputs.

Figure 6:
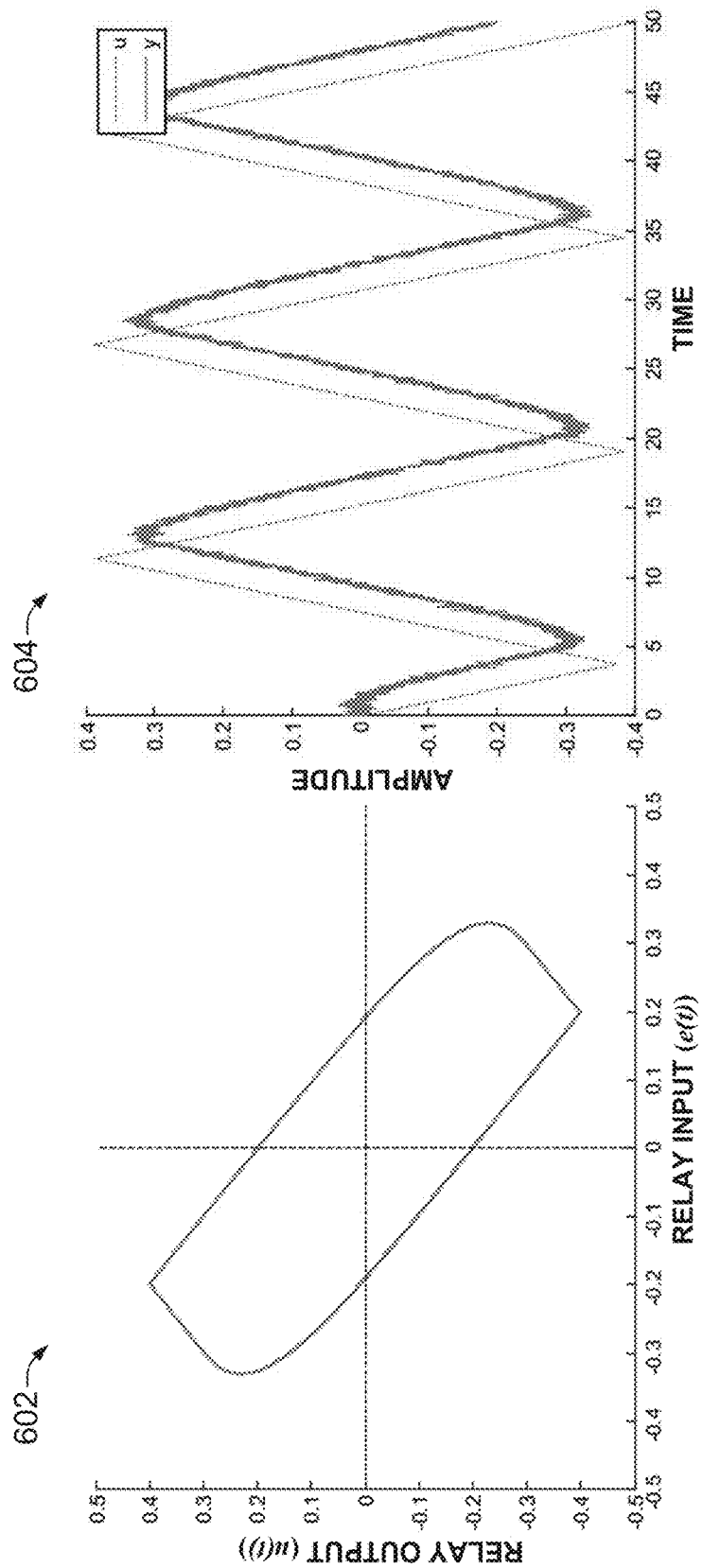
FIG. 6 is a pair of graphs illustrating an example relationship between the plant input and output for switch relay control with hysteresis and a rate limit of 0.1.
Figure 7:
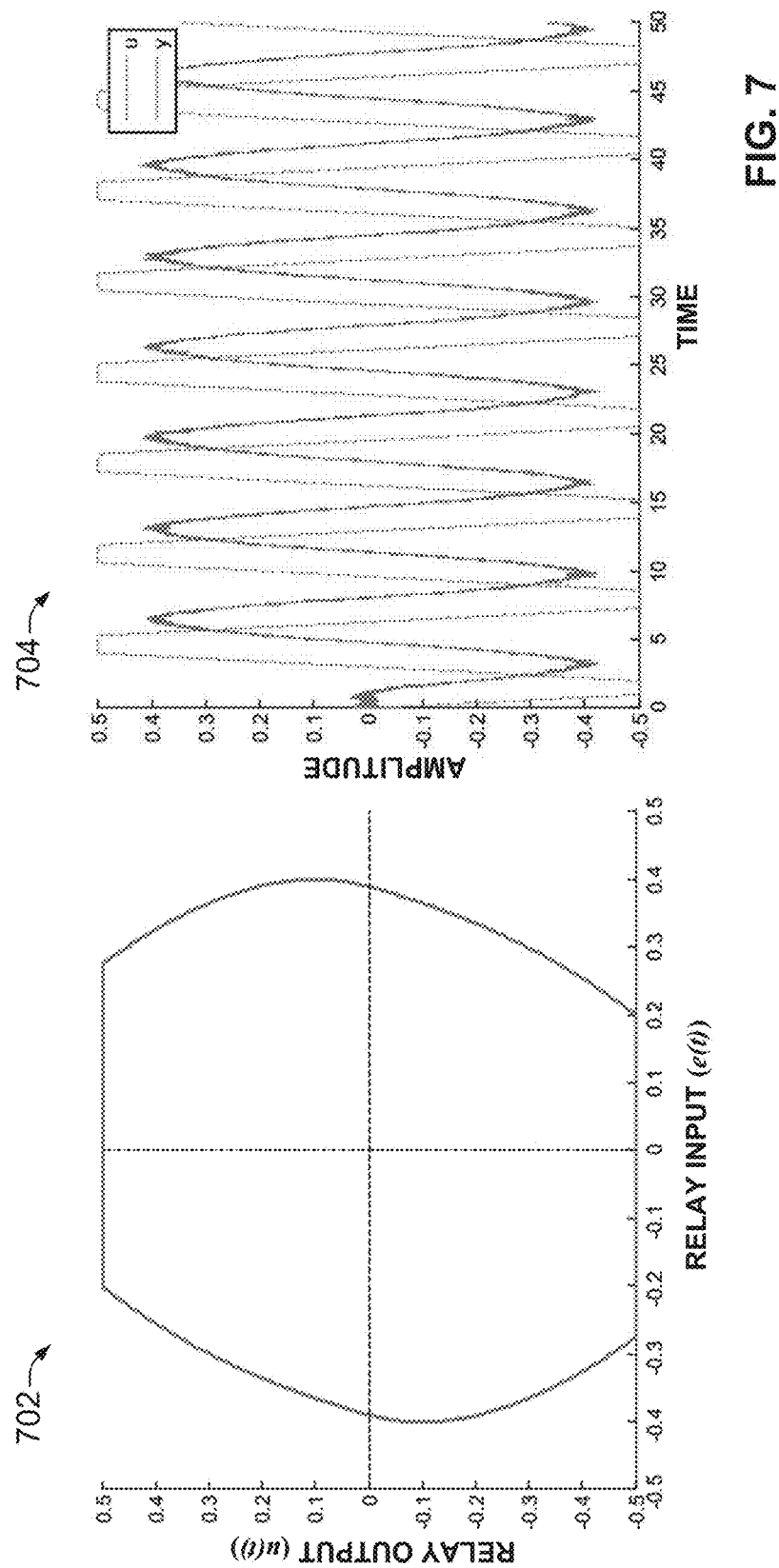
FIG. 7 is a pair of graphs illustrating an example relationship between the plant input and output for switch relay control with hysteresis and a rate limit of 0.5.
Figure 8:
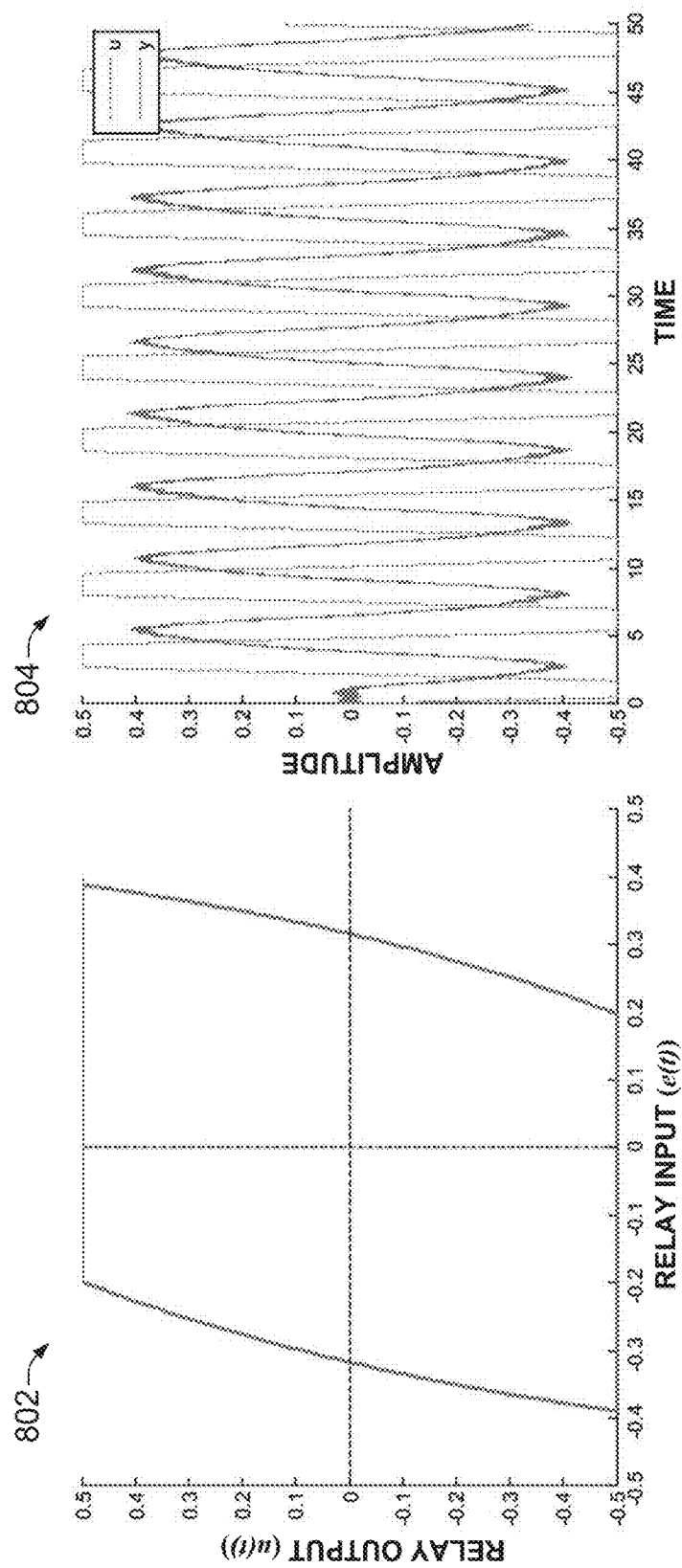
FIG. 8 is a pair of graphs illustrating an example relationship between the plant input and output for switch relay control with hysteresis and a rate limit of 1.

As noted above, embodiments of the systems and methods described herein use a rate-limited relay with hysteresis to excite the controlled system into oscillation before switching the control output to a sinusoidal injection signal in order to accurately measure the amplitude ratio and phase lag between the input and output of the system. The system parameters can then be obtained based on the amplitude ratio and phase lag. FIGS. 6-8 depict example relationships between the system input and output during relay-based control for different rate limits. FIG. 6 is a pair of graphs 602 and 604 illustrating an example relationship between the plant input (control signal u(t)) and plant output (y(t)) for switch relay control with hysteresis and a rate limit of 0.1. FIG. 7 is a pair of graphs 702 and 704 illustrating an example relationship between the plant input and output for switch relay control with hysteresis and a rate limit of 0.5. FIG. 8 is a pair of graphs 802 and 804 illustrating an example relationship between the plant input and output for switch relay control with hysteresis and a rate limit of 1. As demonstrated by these example graphs, the measured system responses—and therefore the corresponding describing functions—are highly variable depending on the values of the control signal bands, the control signal rate limit, and the hysteresis band (which allows the system to tolerate noise). Because of this variability, it can be difficult to derive an accurate describing function that relates the critical gain to the signal amplitude for rate-limited systems with noise consideration using solely a relay-based identification sequence.

Embodiments of the present disclosure overcome this issue by combining rate-limited relay control with an open-loop sinusoidal injection to obtain accurate values of the system parameters, without requiring derivation of the describing function. The rate-limited relay control with hysteresis can accommodate the rate limit of the controlled system (plant), and combining this relay identification with sinusoidal injection can produce accurate parameter identification results.

The system identification system and method is now described using an example first-order-plus-dead-time (FOPDT) plant. It is to be appreciated, however, that the parameter identification system described herein is not limited to use with such plants, but rather is suitable for substantially any mechanical system or process conforming to other types of plant models.

The example plant model of this example can be expressed by the following transfer function:

$$G_p(s) = \frac{k}{T_1 s + 1} e^{-sD} \quad (1)$$

where k is the gain of the system, $T_1$ is the time constant of the system, and D is the dead time of the system.

Figure 9:
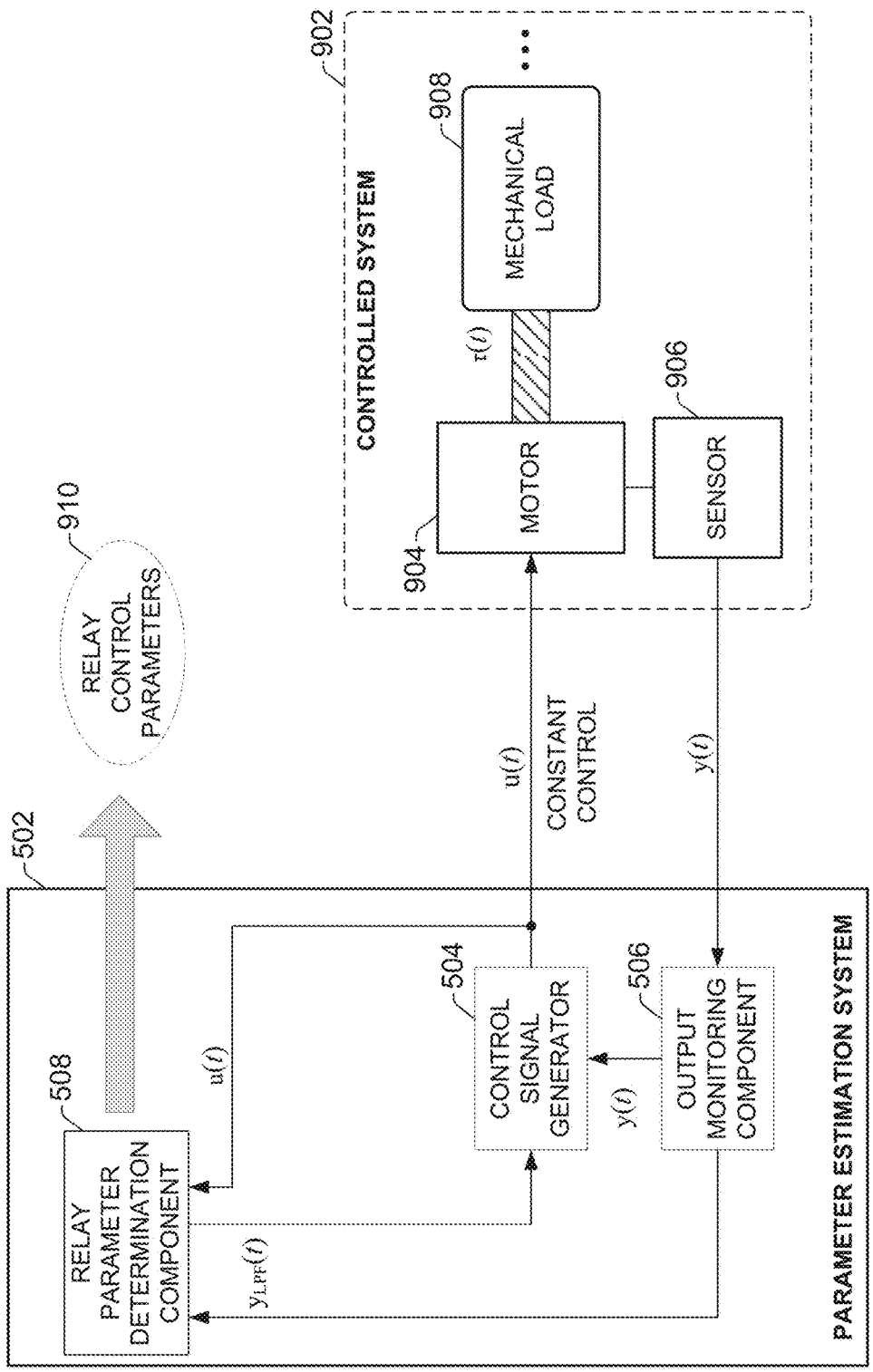
FIG. 9 is a block diagram illustrating a relay control parameter determination stage of a system parameter identification process.

The parameter identification sequence described herein comprises three general stages. The first stage determines the relay control parameters to be used during the relay-based control stage. FIG. 9 is a block diagram illustrating the relay control parameter determination stage. In this example, the controlled system 902 is depicted as a motion system comprising a motor 904 that drives a mechanical load 908. For such systems, the controlled system output may be the speed or position of the mechanical load 908. The motion system may comprise, for example a positioning axis, a rotational component of a machine, a conveyor system, or other such motor-driven loads. However, such systems are only intended to be exemplary, and the parameter identification system described herein is not limited to use with such systems. The controlled system 902 may also be an industrial process in which a process variable (e.g., a temperature, a flow, a pressure, etc.) is regulated by the control system.

The purpose of the relay control parameter determination stage is to obtain suitable relay control parameters 910 for applying relay-based control to the controlled system 902 in the next stage of the parameter identification sequence. These parameters can include a reference signal value and a hysteresis band for the relay-based control that can accommodate the noise of the controlled system 902.

As a first step in the relay control parameter determination stage, the control signal generator 504, under instruction by the relay parameter determination component 508, outputs a constant control command u(t) to the controlled system 902, and gradually increases this control signal until the system output (the value of the controlled system variable or process parameter) reaches a defined low value. In the present example, the defined low value is 20% (or approximately 20%) of the rated value of the system output in steady state. However, the defined low value may be another percentage of the rated value in some embodiments. A sensor 906 or estimator can be used to measure the system output y(t) (e.g., the speed of the motor 904, the position of mechanical load 908, a value of the controlled process variable in the case of an industrial process, etc.) and to generate a corresponding feedback signal y(t) that serves as feedback to parameter identification system 502. The output monitoring component 506 measures the feedback signal y(t), low-pass filters the feedback signal to reduce noise, and provides the low-pass-filtered feedback data $y_{LPF}(t)$ to the relay parameter determination component 508.

In some embodiments, the rated output of the system 902 can be provided manually to the parameter identification system 502 via interface component 516 for comparison purposes. Alternatively, in some embodiments the rated output can be obtained by an automated identification process applied to the system 902. When the relay parameter determination component 508 determines that the value of the feedback signal y(t) has reached 20% or approximately 20% of the rated output of the system 902 (or another defined low output value), the control signal generator 504 is instructed to maintain the control signal u(t) at its current value. The relay parameter determination component 508 then records the present values of the control signal u(t) and the filtered output (feedback) signal $y_{LPF}(t)$ as $U_L$ and $Y_L$, respectively. These are taken to be the low values of the control signal and the output signal, respectively (that is, the values of the control and output signals corresponding to 20% of the rated output).

Also, while the control signal u(t) is held at the constant value, the maximum deviation of the filtered output signal $y_{LPF}(t)$ from its steady state value over a defined time duration is recorded as $N_L$. For example, once steady state at 20% of the rated output has been achieved, the relay parameter determination component 508 can initiate a timer defining a duration over which the filtered output signal $y_{LPF}(t)$ will continue to be monitored. During this duration, the relay parameter determination component 508 will monitor the value of $y_{LPF}(t)$ as the control signal u(t) is held constant. At the end of this duration, the relay parameter determination component 508 will identify a nominal steady state value of the filtered output signal $y_{LPF}(t)$ (e.g., based on an average value of the output signal over the duration, or by another technique), and record the maximum deviation of the output signal $y_{LPF}(t)$ from this nominal steady state value over the duration as $N_L$. This value is indicative of the noise of the system 902 at 20% of the rated output.

Once the values of $U_L$, $Y_L$, and $N_L$ have been obtained, the relay parameter determination component 508 gradually increases the control signal u(t) until the filtered system output $y_{LPF}(t)$ reaches a defined high output. In this example, the defined high output is 80% or approximately 80% of the rated value in steady state. However, other defined high output values are also within the scope of one or more embodiments. The determination that the filtered system output $y_{LPF}(t)$ has reached the defined high output value is again based on a comparison of the system output $y_{LPF}(t)$ with a rated output provided by the user via interface component 516 or otherwise obtained through an automated identification process. Upon determining that the system output y(t) has reached 80% or approximately 80% of the rated output, the relay parameter determination component 508 records the values of the control signal u(t) and the filtered system output $y_{LPF}(t)$ as $U_H$ and $Y_H$, respectively. Also, the maximum deviation of the output signal $y_{LPF}(t)$ from the nominal steady state value over a defined duration (e.g., the same duration used to determine the maximum deviation at 20% of the rated output) is recorded as $N_H$, which is representative of the steady state noise of the system at 80% of rated output.

With these obtained values, the relay parameter determination component 508 determines a suitable configuration for relay-based control. In particular, the reference signal R for the relay-based control is set to be a value midway between the high and low system outputs $Y_H$ and $Y_L$, as given by $$R = \tfrac{1}{2}(Y_H + Y_L) \quad (2)$$

The upper and lower bounds of the relay-based control are set to be $N_H$ and $N_L$, respectively.

The hysteresis band for the relay-based control is set to be $$\varepsilon = n \max(N_H, N_L) \quad (3)$$

where n is a tolerance multiplier to ensure that the hysteresis band tolerates the noise influence (e.g. n=3). In general, the hysteresis band ε for relay control is based on the larger of the noise $N_L$ at 20% of rated output or the noise $N_H$ at 80% of rated output, with an additional tolerance represented by multiplier n. In some embodiments, the user can adjust the tolerance multiplier n via interface component 516.

The mean value of the control signal is given by $$U = \tfrac{1}{2}(U_H + U_L) \quad (4)$$

Figure 10:
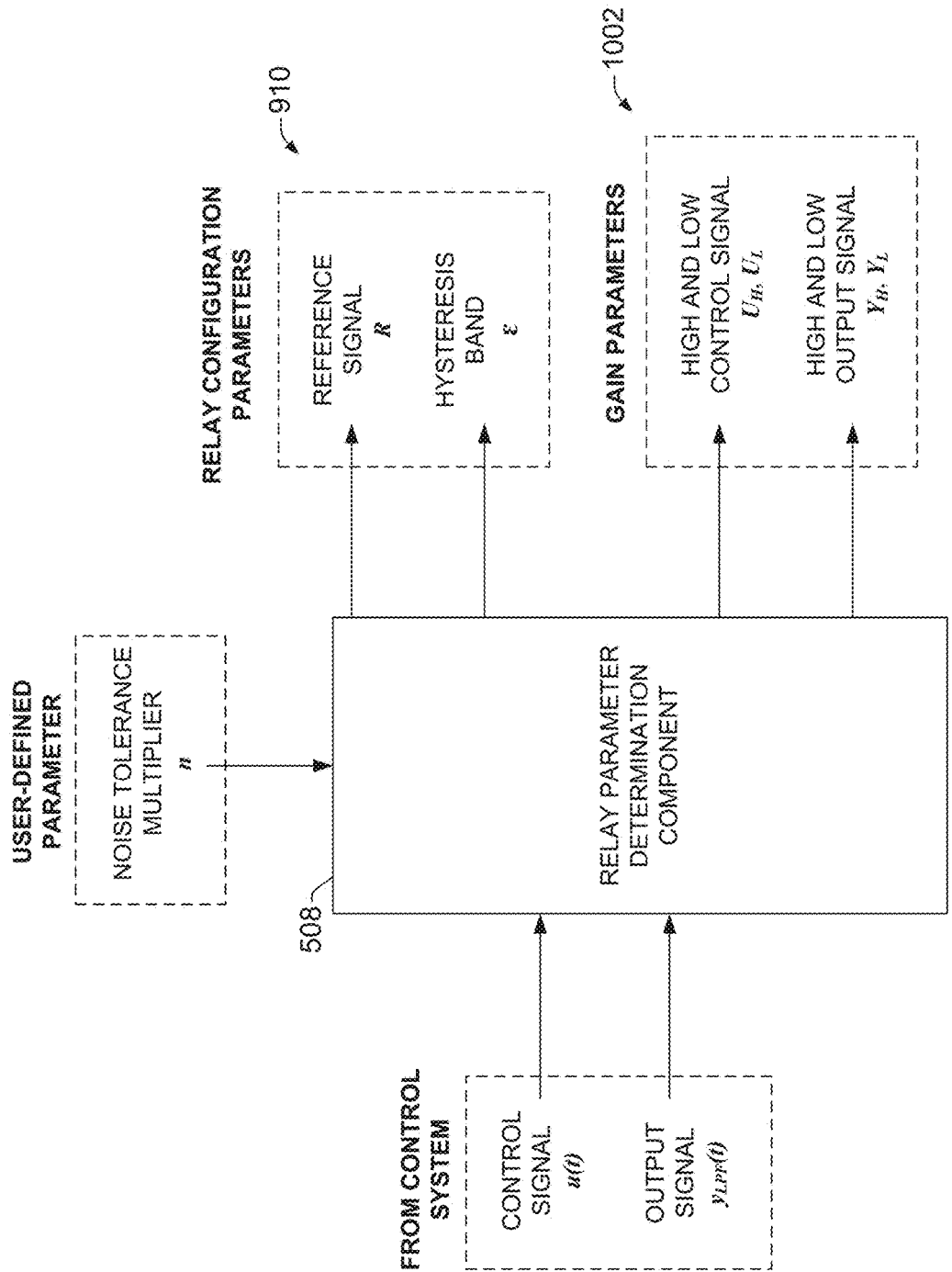
FIG. 10 is a block diagram illustrating example inputs and outputs of a relay parameter determination component.

FIG. 10 is a block diagram illustrating example inputs and outputs of the relay parameter determination component 508, per the operations described above. During the relay control parameter determination stage, the relay parameter determination component 508 obtains data representing the values of the control signal u(t) (from the control signal generator 504) and the filtered feedback (output) signal $y_{LPF}(t)$ (from output monitoring component 506) over time as the relay parameter determination operations described above are performed. Based on these values, the relay parameter determination component 508 generates a value of reference signal R to be used during the relay-based control stage according to equation (2) above. The relay parameter determination component 508 also generates a suitable hysteresis band ε for the relay-based control according to equation (3) above. In some embodiments, the multiplier n used to determine the suitable hysteresis band ε can be provided by the user as a user-provided parameter. Alternatively, multiplier n can be a defined default value likely to satisfy noise tolerance requirements.

The relay parameter determination component 508 also generates a set of gain parameters 1002 comprising the high and low values of the control signal and the output signal ($U_H$, $U_L$, $Y_H$, and $Y_L$). As discussed below, these values can be used to determine the gain k of the system.

Figure 11:
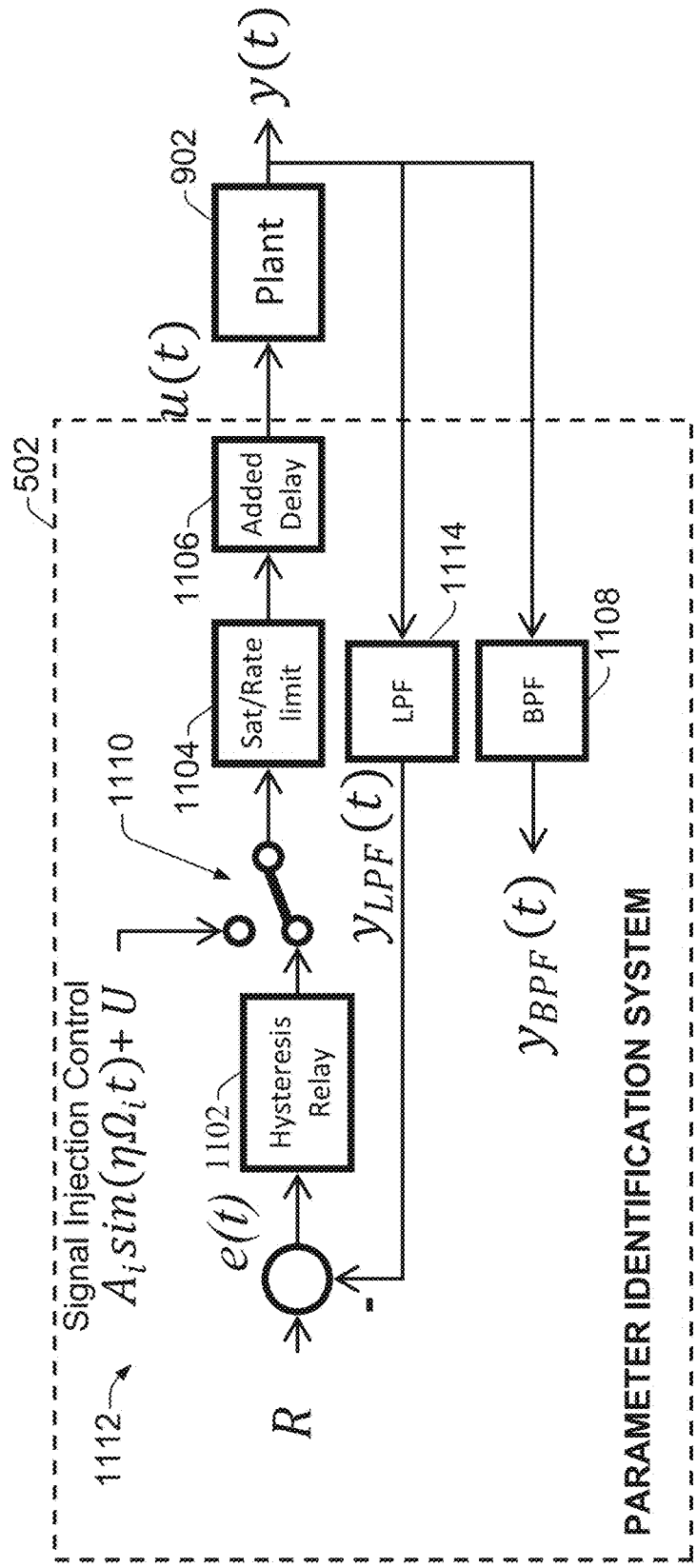
FIG. 11 is a block diagram representing a system parameter identification process that uses relay-based control and open-loop sinusoidal signal injection control.

After the relay control parameters obtained, the system parameter identification sequence can proceed to the relay-based control stage followed by the sinusoidal signal injection stage (the second and third stages, respectively, of the parameter identification sequence). FIG. 11 is a block diagram representing the system parameter identification process. During the relay-based control stage, the output signal u(t) sent to the plant (controlled system) 902 is based on the output of hysteresis relay block 1102 (implemented by relay control and measurement component 510 in conjunction with the control signal generator 504), which is configured in accordance with hysteresis band ε obtained during the relay control parameter determination stage. The input of the hysteresis relay block 1102 is the error signal e(t) representing the difference between the reference signal R (also obtained during the relay control parameter determination stage) and the filtered plant output signal $y_{LPF}(t)$ (where a low-pass filter block 1114 implemented by the output monitoring component 506 filters the measured output signal y(t) for noise reduction to produce filtered output signal $y_{LPF}(t)$). A saturation/rate limit block 1104 (which can be implemented by control signal generator 504) applies a rate limit to the output of the hysteresis relay block 1102, thereby enforcing a control signal rate limit of the control application.

A delay block 1106 (also implemented by control signal generator 504) can be used to add an artificial dead time $D_i$ to the control signal u(t), where i is an integer representing an execution count of the relay-based control and sinusoidal signal injection stages. As will be described in more detail below, if multiple executions of the relay-based control and sinusoidal signal injection stages are performed (in order to obtain ensure accuracy of the system parameters, or to collect sufficient data points to identify higher order system parameters), the amount of the artificially added dead time $D_i$ can be changed with each execution.

As will be described in more detail below, the parameter identification system 502 applies this relay-based control first in order to oscillate the controlled system (plant) 902. The parameter identification system 502 then switches the control signal u(t) from the output of the hysteresis relay block 1102 to a sinusoidal signal 1112 (this switching is represented by switch 1110 in FIG. 11), where the sinusoidal signal is configured with the appropriate phase, frequency, and amplitude to continue the oscillation started by the relay-based control while satisfying the rate limit and saturation. The sinusoidal signal is configured to have a phase that substantially matches the phase of the relay control output, thereby continuing the oscillation started by the relay-based control. The amplitude of the sinusoidal signal is set to ensure that the rate of the control signal does not exceed a rate-limit of the control application. This technique yields accurate system parameters without the need to obtain a describing function relating critical gain to signal frequency, which can often be complex and difficult to derive.

Figure 12:
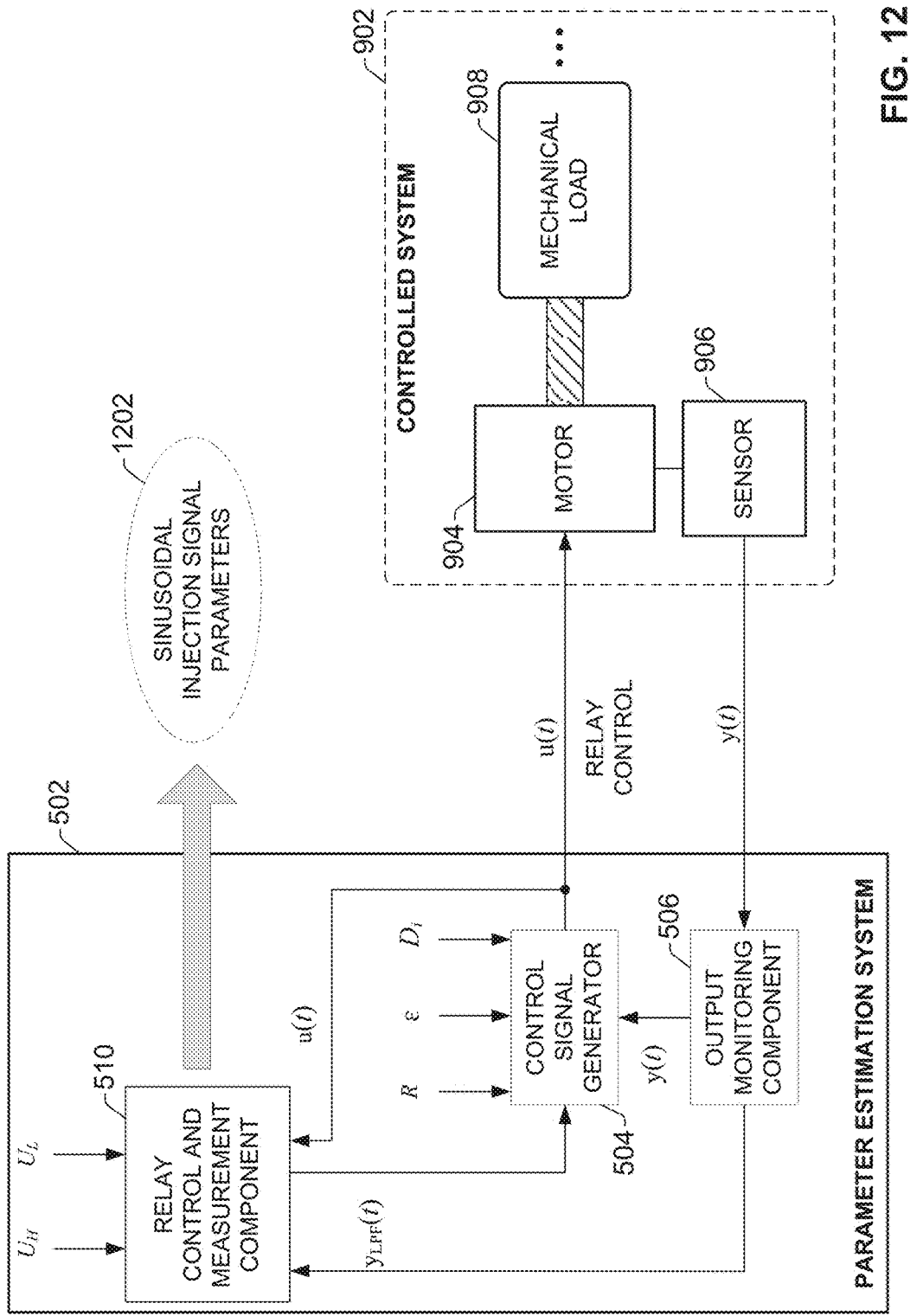
FIG. 12 is a block diagram illustrating a relay-based control stage of a system parameter identification process.

The relay-based control stage is now described. FIG. 12 is a block diagram illustrating the relay-based control stage. During this stage, the relay control and measurement component 510 instructs the control signal generator 504 to generate control signal u(t) in accordance with relay-based control in order to oscillate controlled system 902. Once the controlled system 902 is oscillating, the relay control and measurement component 510 determines suitable sinusoidal injection signal parameters 1202 to be used to generate the sinusoidal injection signal for the subsequent sinusoidal signal injection stage. These sinusoidal injection signal parameters 1202 can include an amplitude and frequency for the sinusoidal signal.

The relay-based control and sinusoidal signal injection stages may be run multiple times depending on the control application. For the first execution of the relay-based control stage, no artificial dead time is added to the control signal u(t) by the delay block 1106 (dead time $D_1$ is set to zero).

Using the relay reference signal R and the hysteresis band ε obtained during the relay control parameter determination stage (as well as an artificially added dead time $D_i$, which is zero for this initial execution of the relay-based control stage), the control signal generator 504 generates a relay output signal u(t) to excite the controlled system 902, causing the system 902 to oscillate. The output signal u(t) conforms to a rate-limited relay output, where the relay input is the error signal e(t) between the reference signal R (given by equation (2)) and the filtered signal $y_{LPF}(t)$ of the feedback signal y(t) measured by the output monitoring component 506, and where the hysteresis band for the relay is the value E given by equation (3). Because of the rate limit applied by the control signal generator 504, the frequency will be less than the frequency without rate limit. However, the frequency does not need to be close to the negative real axis of the Nyquist plot since the parameters will be determined in the subsequent sinusoidal signal injection stage.

During oscillation of the controlled system 902, the relay control and measurement component 510 can execute a frequency determination algorithm to determine the oscillation frequency of filtered output signal $y_{LPF}(t)$, denoted as $\Omega_1$. The relay control and measurement component 510 can also determine an amplitude $A_1$ to be used for the sinusoidal signal according to $$A_1 = \min\left(\frac{\rho}{\Omega_1}, \frac{U_H - U_L}{2}\right) \quad (5)$$

where $\rho$ is a control signal rate limit. According to equation (5), the amplitude $A_1$ is set to be the smaller of half of the range between $U_L$ and $U_H$ (the constant control signal values corresponding to 20% and 80%, respectively, of the rated output of the controlled system) or the rate limit divided by the measured oscillation frequency. Setting the amplitude $A_1$ in this manner ensures that the slope of the sinusoidal signal will not exceed the rate limit $\rho$, which may be a constraint of the particular system or process being controlled. In some embodiments, the control signal rate limit $\rho$ can be entered as a user-defined parameter via interface component 516, where the rate limit is selected to suit the needs of the control application. Alternatively, in some embodiments a suitable rate limit $\rho$ can be determined via an automated identification process.

Figure 13:
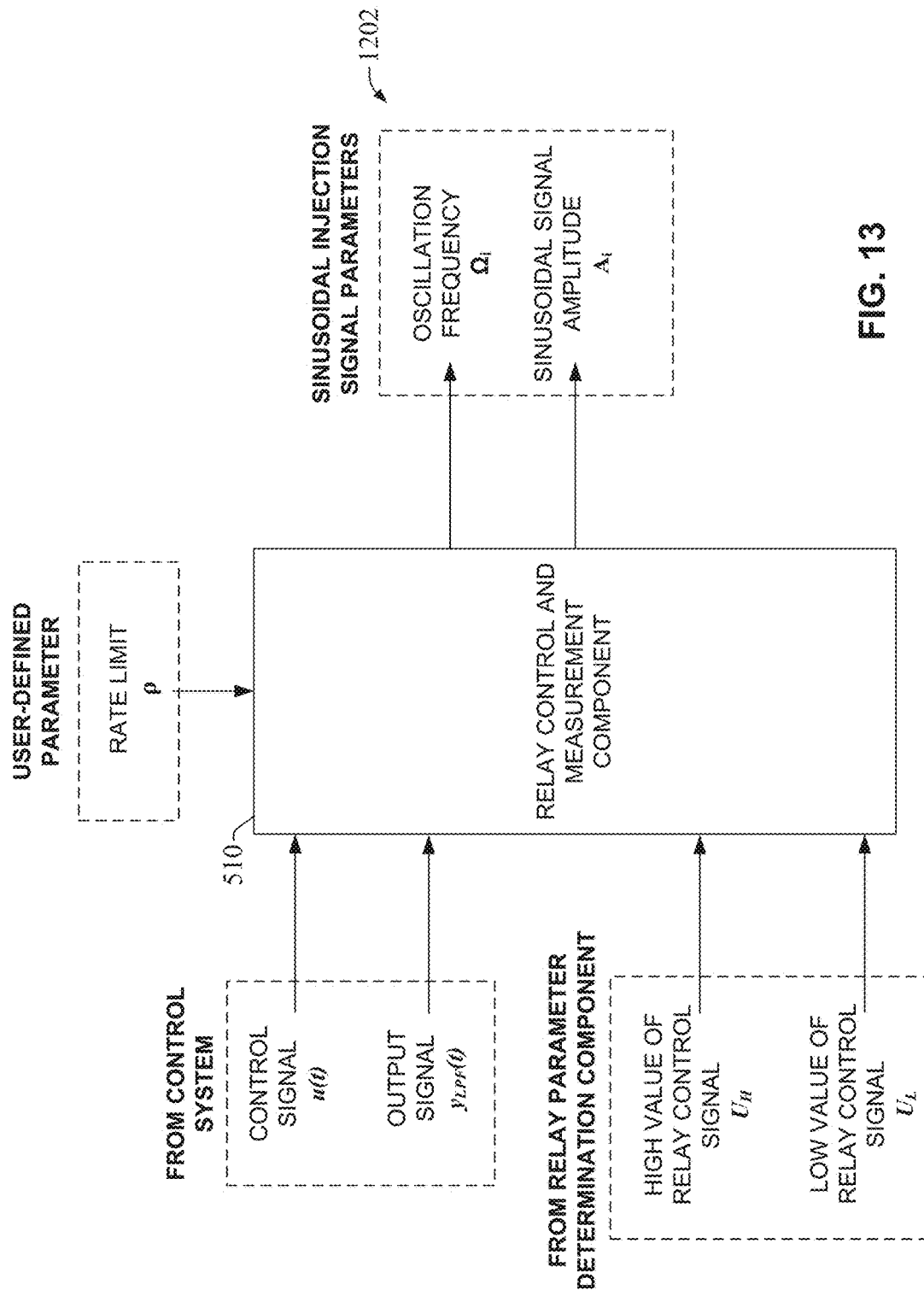
FIG. 13 is a block diagram illustrating example inputs and outputs of a relay control and measurement component.

FIG. 13 is a block diagram illustrating example inputs and outputs of the relay control and measurement component 510, per the operations described above. During the relay-based control stage, relay control and measurement component 510 obtains data representing the values of the control signal u(t) (from the control signal generator 504) and the filtered system output signal $y_{LPF}(t)$ (from output monitoring component 506) over time as the control signal u(t) is controlled as a rate-limited relay output with hysteresis, using the reference signal value R and hysteresis band ε determined during the relay control parameter determination stage (as well as any artificially added dead time $D_i$, which is zero for the first execution of the relay-based control stage). The relay control and measurement component 510 also receives the high and low values of the control signal $U_H$ and $U_L$, respectively, recorded during the relay control parameter determination stage. Based on these values, the relay control and measurement component 510 generates a value of the oscillation frequency $\Omega_1$ based on the measured oscillation frequency of the filtered output signal $y_{LPF}(t)$ during the relay-based control. The relay control and measurement component 510 also determines a value of the amplitude $A_1$ to be used during the sinusoidal signal injection stage according to equation (5) above. In some embodiments, the control signal rate limit $\rho$ used to limit the amplitude $A_1$ can be provided by the user as a user-provided parameter. Alternatively, a suitable rate limit $\rho$ can be determined using an automated identification process applied to the controlled system 902.

After the relay-based control stage has obtained values for the oscillation frequency $\Omega_1$ and amplitude $A_1$, the parameter identification system 502 switches to open-loop sinusoidal signal injection control (the third stage of the parameter identification sequence). Returning to the functional block diagram of FIG. 11, this transition is represented by the switch 1110 transitioning from the output of the hysteresis relay block 1102 to the sinusoidal signal 1112. During this open-loop stage, the output signal y(t) measured from the controlled system (plant) 902 is passed through a bandpass filter 1108 (which can be implemented, for example, by the output monitoring component 506) to remove offset and noise, yielding a smooth sinusoidal output signal $y_{BPF}(t)$ at the oscillation frequency. As will be described below, the phase difference and amplitude ratio can then be derived based on this filtered output signal $y_{BPF}(t)$.

Figure 14:
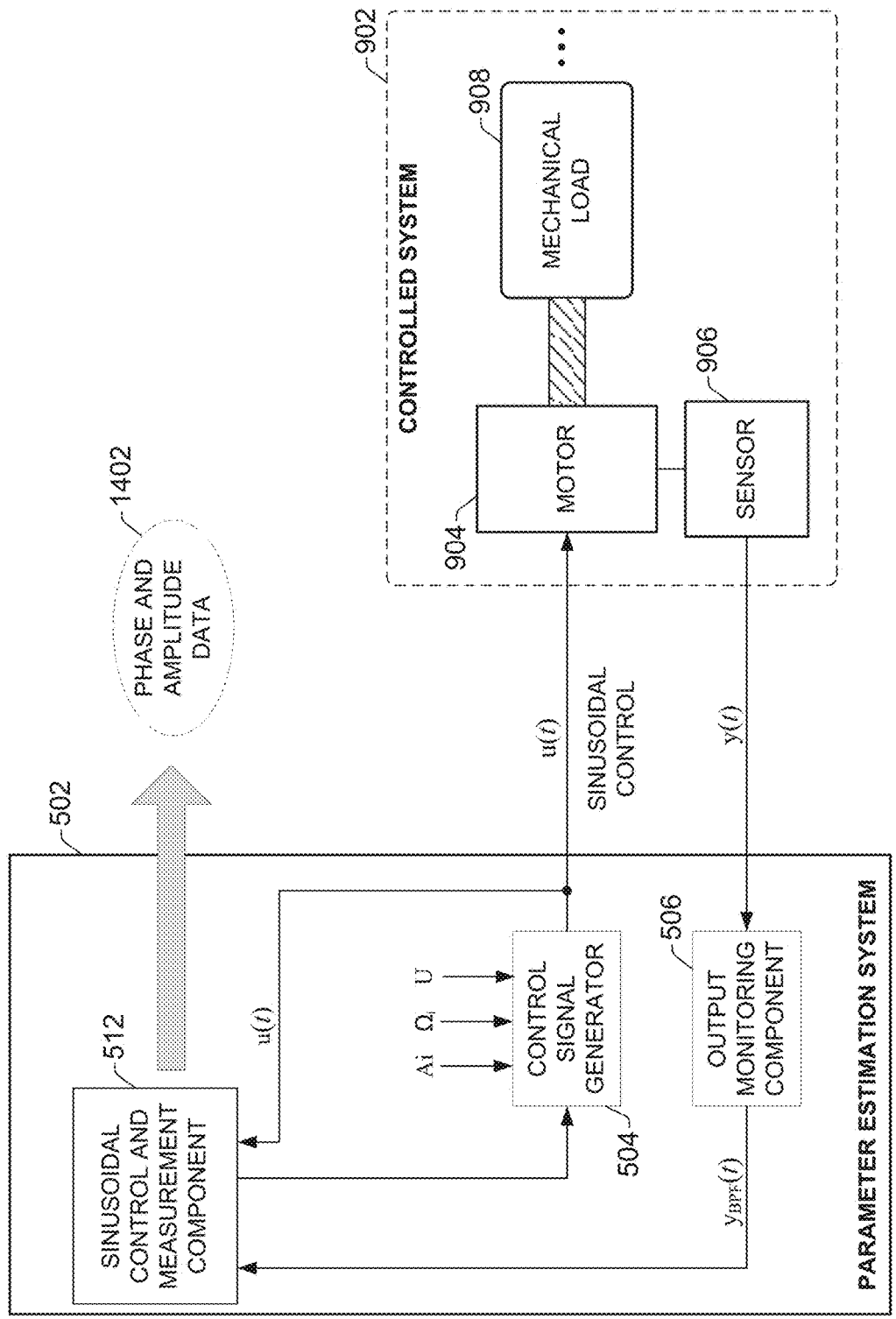
FIG. 14 is a block diagram illustrating a sinusoidal signal injection stage of a system parameter identification process.

FIG. 14 is a block diagram illustrating the sinusoidal signal injection stage. At the end of the relay-based control stage, the controlled system 902 is still in oscillation. By injecting a sinusoidal signal having the oscillation frequency $\Omega_1$ and amplitude $A_1$ obtained during the relay-based control stage, and whose phase is substantially aligned with that of the relay control signal, the system oscillation will continue when control transitions from relay-based control to sinusoidal control. The sinusoidal signal injected by control signal generator 504 can be given by $$u(t) = A_1 \sin(\eta \Omega_1 t) + U \quad (6)$$

where $\eta$ is a frequency multiplier that is applied to increase the frequency relative to the relay-based control oscillation frequency $\Omega_1$ in order to increase the phase difference between the output signal y(t) and the input (control) signal u(t) in the case of near zero phase difference (e.g., $\eta=2$). In some embodiments, frequency multiplier $\eta$ can be a defined default value that is automatically applied by the parameter identification system 502. Alternatively, in some embodiments the frequency multiplier $\eta$ can be entered or modified by the user via interface component 516. The sinusoidal injection signal is offset by the mean value U of the control signal obtained during the relay control parameter stage (based on equation (4)).

Figure 15:
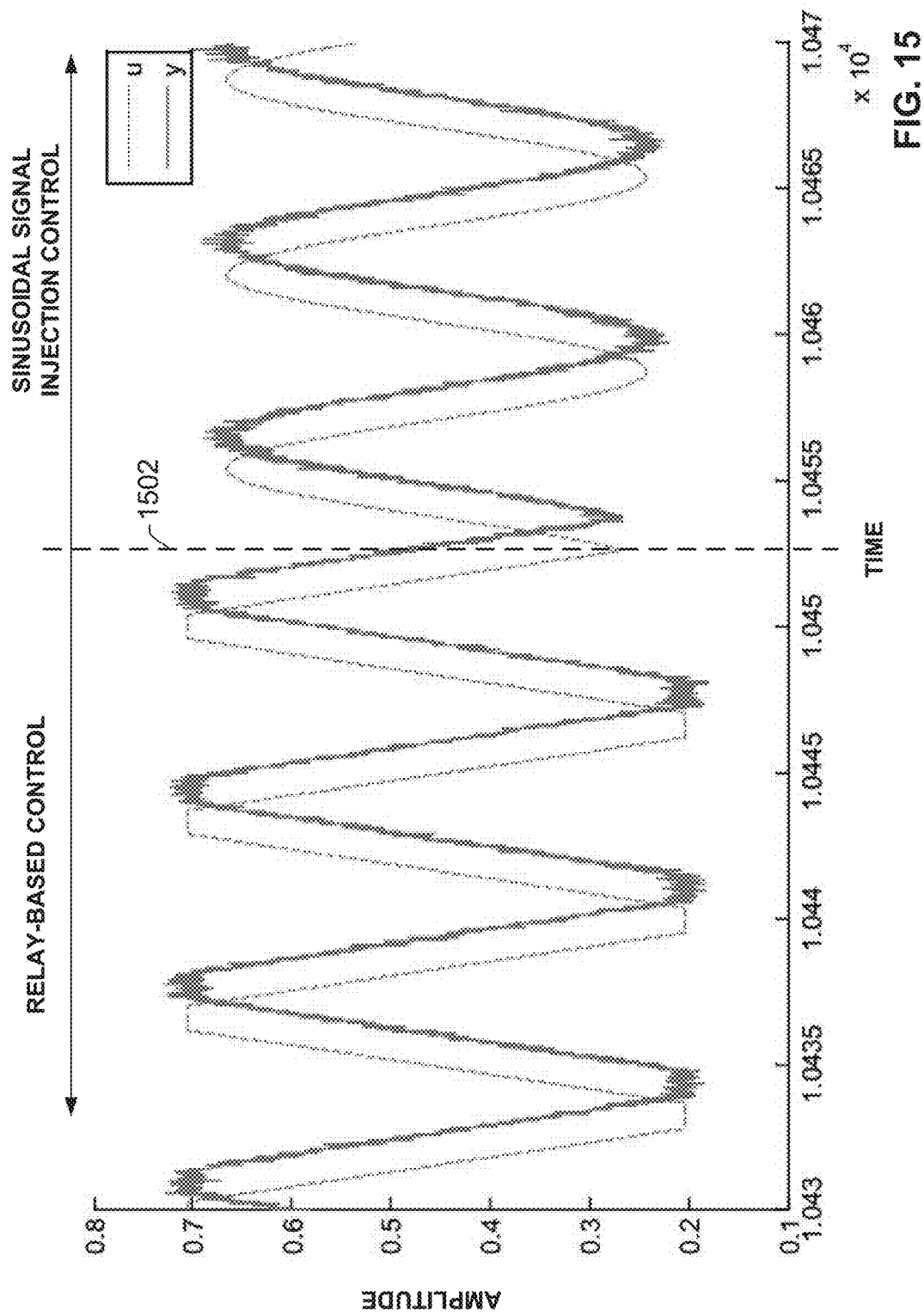
FIG. 15 is a graph that plots a control signal u(t) together with an output signal y(t) over time for an example control scenario.

FIG. 15 is a graph that plots the control signal u(t) (the dashed line) together with the output signal y(t) (the solid line) over time for an example control scenario. The vertical dashed line 1502 represents the time of transition between the relay-based control stage and the sinusoidal signal injection stage. As can be seen in this graph, controlling the sinusoidal control signal u(t) using the oscillation frequency $\Omega_1$ and amplitude $A_1$ obtained during the relay-based control stage (e.g., based on equation (6)) causes the phase of the control and output signals during the sinusoidal signal injection control stage to be substantially aligned with the corresponding phases of the relay-based control stage. In this way, the oscillation established during the relay-based control stage is continued during the sinusoidal signal injection stage.

Returning to FIG. 14, the system output signal y(t) is bandpass filtered by the output monitoring component 506 to remove offset and noise, thereby obtaining a smooth sinusoidal signal $y_{BPF}(t)$ at the oscillation frequency. Based on a comparison of the sinusoidal control signal u(t) and the filtered sinusoidal signal $y_{BPF}(t)$, the sinusoidal control and measurement component 512 calculates phase and amplitude data 1402, which will subsequently be used to determine the system parameters of controlled system 902.

At steady state, the sinusoidal control and measurement component 512 measures the phase difference between the control signal u(t) and the filtered sinusoidal signal $y_{BPF}(t)$, denoted as $\Theta_1$. The sinusoidal control and measurement component 512 also determines the ratio between the amplitudes of the control signal u(t) and the filtered sinusoidal signal $y_{BPF}(t)$, denoted as $\Phi_1$.

Figure 16:
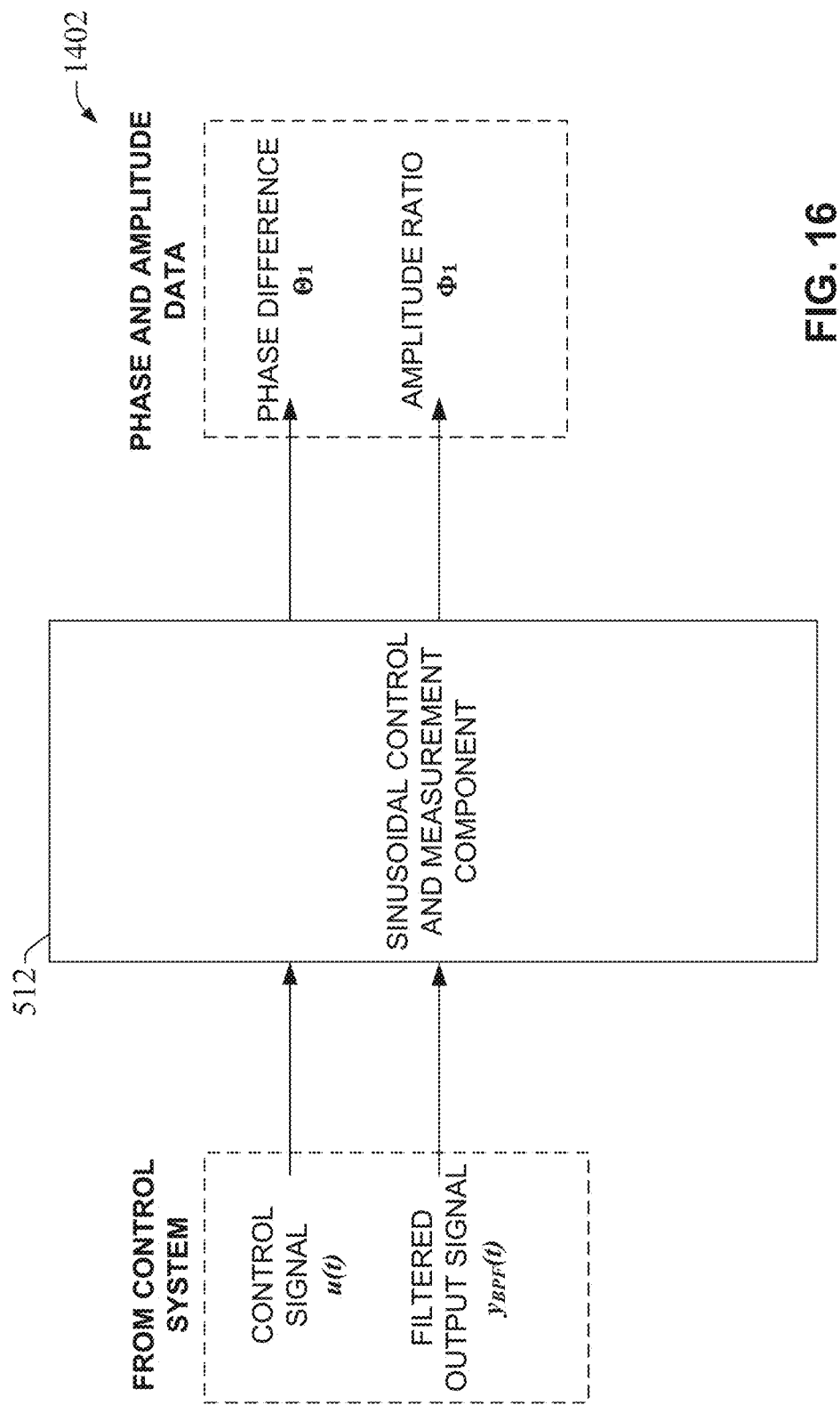
FIG. 16 is a block diagram illustrating inputs and outputs of a sinusoidal control and measurement component.

FIG. 16 is a block diagram illustrating inputs and outputs of the sinusoidal control and measurement component 512, per the operations described above. During the sinusoidal signal injection stage, the control signal u(t) is a sinusoidal signal conforming to equation (6) (or a reasonable variation thereof). The resulting output signal y(t) from the controlled system 902 is received by the parameter identification system 502 and passed through a bandpass filter to obtain filtered signal $y_{BPF}(t)$. The sinusoidal control and measurement component 512 receives data representing control signal u(t) and the corresponding filtered signal $y_{BPF}(t)$, and determines the phase difference $\Theta_1$ and amplitude ratio $\Phi_1$ between these signals based on analysis of the received data. Any suitable calculation technique can be used to measure the phase difference $\Theta_1$ and amplitude ratio $\Phi_1$.

For plants having complex plant models, the relay control parameter stage, relay-based control stage, and sinusoidal signal injection stage can be repeated two or more times, using a different artificial dead time value $D_i$ for each execution of the three stages (where i is an integer representing the ith execution of the stages). In some scenarios, it may also be desirable to execute the three stages multiple times in order to minimize calculation error by obtaining multiple sets of data. For the present FOPDT example, it is assumed that the three stages are only executed once, and the data set obtained as a result of the single execution is used to identify the parameters of the controlled system 902.

Figure 17:
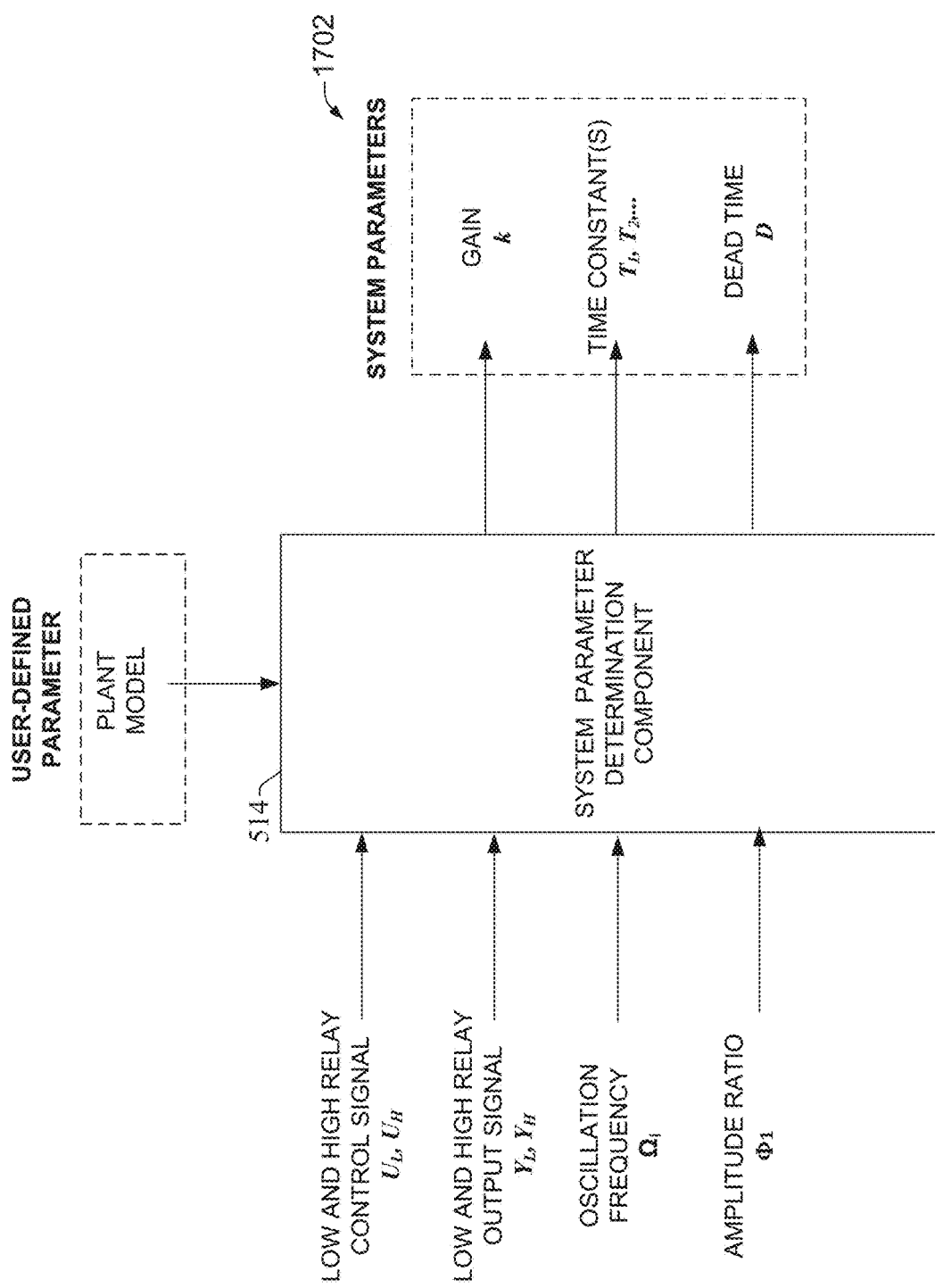
FIG. 17 is a block diagram illustrating example inputs and outputs of a system parameter determination component.

FIG. 17 is a block diagram illustrating example inputs and outputs of the system parameter determination component 514, which calculates values of the system parameters based on data obtained during the relay control parameter stage, relay-based control stage, and sinusoidal signal injection stage. The system parameter determination component 514 uses the known system model corresponding to the controlled system 902 to determine the system parameters. In some embodiments, the parameter identification system 502 allows the user to select, via the interface component 516, an appropriate plant model from a set of common plant models (e.g., first order plus dead time model, second order plus dead time model, etc.) corresponding to the control application being analyzed.

For the FOPDT model of the present example, the system parameter determination component 514 determines the system parameters according to $$k = \frac{Y_H - Y_L}{U_H - U_L} \quad (7)$$

$$T_1 = \begin{cases} \frac{1}{\Omega_1}\sqrt{\frac{k^2}{\Phi_1^2} - 1}, & k \geq \Phi_1 \\ 0, & k < \Phi_1 \end{cases} \quad (8)$$

where k and $T_1$ are the gain factor and time constant, respectively, of the first-order controlled system (see the plant model of equation (1)).

The gain k of the system 902 is determined based on the ratio of the difference between the high and low output signals ($Y_H$ and $Y_L$) and the difference between the high and low control signals ($U_H$ and $U_L$) obtained during the relay control parameter determination stage. If the calculated gain k is less than the amplitude ratio $\Phi_1$ obtained during the sinusoidal signal injection phase, the time constant $T_1$ of the system 902 is taken to be zero. If the calculated gain k is greater than or equal to the amplitude ratio $\Phi_1$, the time constant $T_1$ is calculated based on the gain k and the oscillation frequency $\Omega_1$ obtained during the relay-based control stage.

If $T_1/D$ is very small, then $$\frac{k^2}{\Phi_1^2} - 1$$

may be less than 0. If such is the case, the accuracy of $T_1$ is not important since the system is delay-dominant and $T_1$ can be ignored in the controller design.

Because of the nature of relay-based control, the dead time D of the controlled system will not be greater than the period of oscillation. The system parameter determination component 514 then calculates the dead time D of controlled system 902 according to $$D = \begin{cases} \frac{1}{\Omega_1}(\Theta_1 - \mathrm{atan2}(T_1\Omega_1, 1)), & \Theta_1 \geq \mathrm{atan2}(T_1\Omega_1, 1) \\ 0 & \Theta_1 < \mathrm{atan2}(T_1\Omega_1, 1) \end{cases} \quad (9)$$

If the phase difference $\Theta_1$ determined during the sinusoidal signal injection stage is less than a tan $2(T_1\Omega_1, 1)$, the dead time D of the system 902 is taken to be zero. If the phase difference $\Theta_1$ is greater than or equal to a tan $2(T_1\Omega_1, 1)$, the dead time D is calculated based on the oscillation frequency $\Omega_1$ obtained during the relay-based control stage, the phase difference $\Theta_1$, and the calculated time constant $T_1$.

Using the techniques described above, system parameter identification system 502 can identify accurate values of the system gain k, time constant $T_1$, and dead time D of a system or process with dead time and a rate-limited control signal without the need to obtain a describing function for the system.

As noted above, for more complex systems, multiple sets of data generated by multiple executions of the relay control parameter stage, relay-based control stage, and sinusoidal signal injection stage can be used to solve for the system parameters. For example, a second-order-plus-dead-time (SOPDT) plant can be expressed by the following transfer function:

$$G_p(s) = \frac{k}{(T_1 s + 1)(T_2 s + 1)} e^{-sD} \quad (10)$$

To identify system parameters k, $T_1$, $T_2$, and D for this second orders system, the relay control parameter stage, relay-based control stage, and sinusoidal signal injection stage can be executed twice to obtain two sets of data. For the first execution of the three stages (i=1), the artificial dead time $D_1$ can be set to zero, as in the first-order system example described above (that is, the artificial delay introduced to the control signal u(t) by delay block 1106 is zero).

After the first generation of the three stages has produced a first set of data (high and low relay control signal values $U_H$ and $U_L$, high and low relay output signals $Y_H$ and $Y_L$, oscillation frequency $\Omega_1$, amplitude ratio $\Phi_1$), the parameter identification system 502 executes the three stages a second time, this time with the artificial dead time $D_2$ set to a non-zero delay value (causing the delay block 1106 to add a delay to the control signal u(t) during the relay-based control and sinusoidal signal injection stages). This second execution of the three stages produces a second set of data, including a second oscillation frequency $\Omega_2$ and a second amplitude ratio $\Phi_2$.

With the first and second sets of data obtained in this manner, the system parameter determination component 514 can determine the gain k for the second-order system based on equation (7) above. The values of $Y_H$, $Y_L$, $U_H$, and $U_L$ will be substantially the same for both sets of data, since these values are substantially unaffected by the delay $D_2$. As such, the system gain k can be determined using the values of $Y_H$, $Y_L$, $U_H$, and $U_L$ from either of the two sets of data (or based on an average of these values over the two executions of the three stages).

The system parameter determination component 514 can then determine the time constants $T_1$ and $T_2$ for the second-order system by solving the transfer function amplitude equations:

$$\Phi_1^2 = \frac{k^2}{(T_1^2\Omega_1^2 + 1)(T_2^2\Omega_1^2 + 1)} \quad (11)$$

$$\Phi_2^2 = \frac{k^2}{(T_1^2\Omega_2^2 + 1)(T_2^2\Omega_2^2 + 1)} \quad (12)$$

Finally, the system parameter determination component 514 can determine the dead time D of the second-order system using the time constants $T_1$ and $T_2$ obtained above according to $$D = \frac{1}{\Omega_1}(\Theta_1 - \text{atan2}(T_1\Omega_1, 1) - \text{atan2}(T_2\Omega_1, 1)) \quad (13)$$

Thus, the parameter identification system 502 obtains values of the system parameters k, $T_1$, $T_2$, and D for the second-order system with dead time having the plant model given by transfer function (10) above.

The three stages described above can be executed additional times, as needed, in order to obtain system parameters for higher order systems. For example, for a third-order system, the three stages can be executed three times, where the artificial dead time $D_i$ applied to the control signal u(t) is changed for each execution cycle. This yields three sets of data (for i=1, 2, and 3) which can be used to calculate the system parameters for the third-order system based on the transfer functions for the system.

In some embodiments, the user can provide information about the controlled system via the interface component 516 prior to execution of the parameter identification sequence. This can include, for example, selecting a type of the system (e.g., first-order, second-order, etc.) from a set of available system types rendered by the interface component 516. The user can then initiate the parameter identification sequence. Based on the provided system type information, the parameter identification system 502 will run the three stages described above an appropriate number of times to obtain the necessary data sets, and generate the system parameters based on the data sets using the appropriate plant model (transfer functions) corresponding to the system type selected by the user. In some embodiments, as an alternative to manual selection of the system type prior to execution of the parameter identification sequence, the parameter identification system 502 can infer the type of system using an automated identification process.

Also, in some embodiments, the parameter identification system 502 can execute the three stages multiple times—in excess of the number of executions required for the selected type of system—in order to improve accuracy of the system parameter estimations using diverse data sets.

Figure 18:
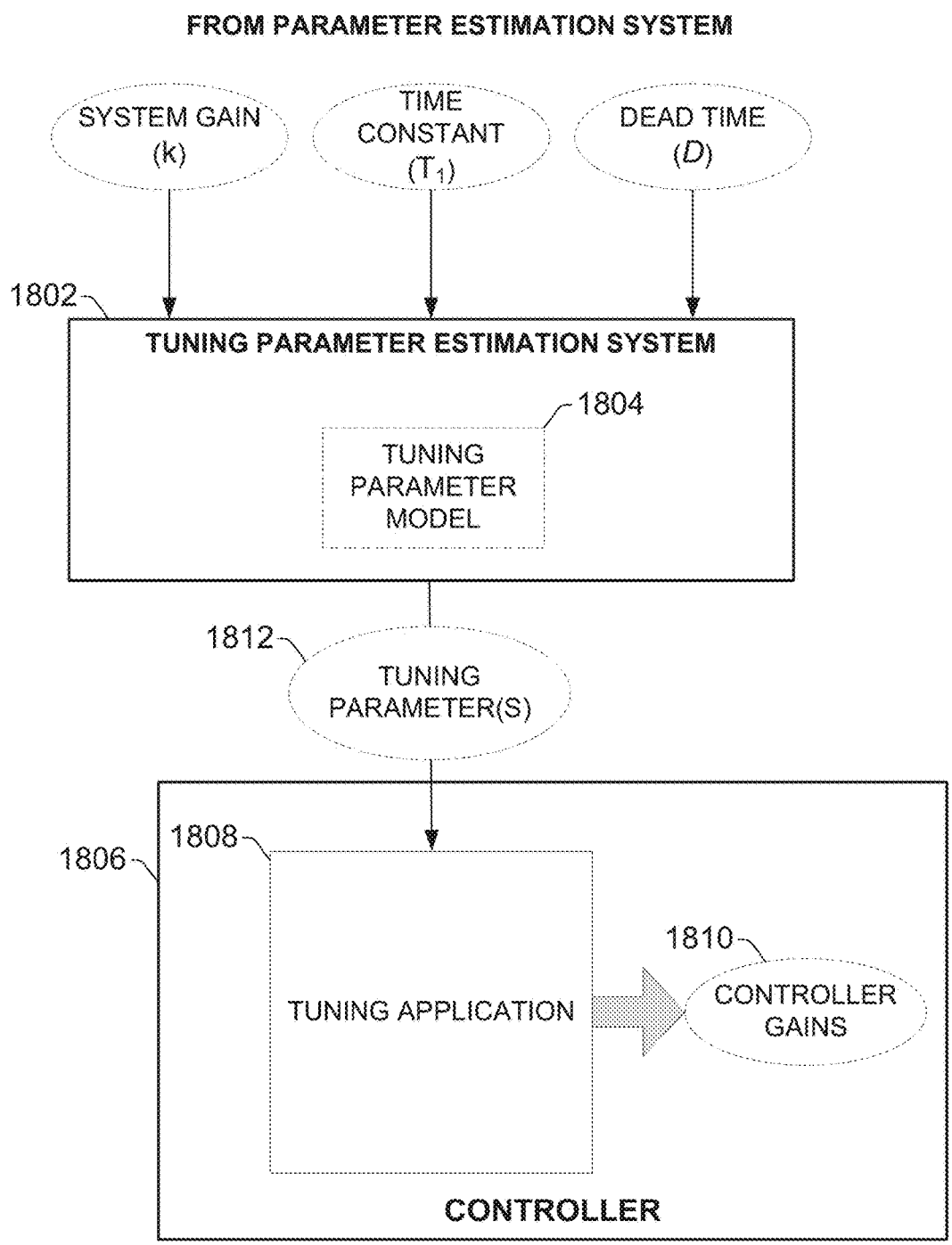
FIG. 18 is a block diagram illustrating generation of tuning parameters based on system parameters obtained by a parameter identification system.

In some embodiments, after execution of the parameter identification sequence (comprising one or more executions of the three stages described above) the identified system parameters can be rendered on a client device by the interface component 516. The system parameters can be used by a system designer to assist in designing and/or tuning a suitable controller for stable robust control of the system. Alternatively, the identified system parameters can be provided to a tuning parameter estimation system capable of selecting suitable controller tuning parameters based on the system parameters. FIG. 18 is a block diagram illustrating generation of tuning parameters based on the system parameters obtained by the parameter identification system 502. In this example, a tuning application 1808 is used to tune controller gains for controller 1806, where the controller 1806 controls operation of a motor-driven motion system or a process control system (not shown). A tuning parameter estimation system 1802 can determine suitable tuning parameters 1812 for controller 1806 based on the identified system parameters (in the illustrated example, a first-order system with dead time is assumed; as such the system parameters are the system gain k, time constant $T_1$, and dead time D).

The tuning parameter estimation system 1802 is provided with values of the system parameters, either via manual input or from the parameter identification system 502 itself. Tuning parameter estimation system 1802 can then determine one or more suitable tuning parameters 1812 for controlling a system characterized by the provided system parameters. In some embodiments, tuning parameter estimation system 1802 can determine the suitable tuning parameter(s) 1812 by referencing a previously defined tuning parameter model 1804 that defines a functional relationship between robustly stabilizing tuning parameters and the system parameters.

In an example embodiment, the tuning parameter estimation system 1802 can be configured to determine, as the one or more tuning parameters, values of one or both of the controller bandwidth $\omega_0$ and system gain estimate $b_0$ for the controller 1806. In such embodiments, the tuning parameter model 1804 can define a functional relationship between robustly stabilizing tuning parameters ($\omega_0$ and $b_0$) and system parameters k, $T_1$, and D.

Once suitable tuning parameter(s) 1812 have been determined, tuning parameter estimation system 1802 can provide these values to the tuning application 1808. Alternatively, tuning parameter estimation system 1802 can render the estimated tuning parameter(s) on a user interface, allowing a user to manually enter these values into the tuning application 1808. Tuning application 1808 can then set one or more controller gains 1810 based on the provided tuning parameter value(s). For controllers that support active disturbance rejection control (ADRC), only the controller bandwidth $\omega_0$ and system gain estimate $b_0$ need to be optimized to facilitate tuning the controller 1806 for robust stable control, thereby simplifying the process of tuning of the control loop.

In some embodiments, the tuning parameter estimation system 1802 may be integrated with the parameter identification system 502, such that the parameter identification system 502 can send the identified values of the system parameters to the tuning parameter estimation system 1802, which can proceed to generate suitable tuning parameters 1812 for the system characterized by the system parameter values. In such embodiments, the parameter identification system 502 and the tuning parameter estimation system 1802 may be integrated subsystems of an industrial controller, and industrial drive, a chip-based controller, or another control platform.

In some applications, the parameter identification system 502 can be used to determine accurate estimates of the system parameters during initial deployment of the motion or process control system, prior to normal operation. For example, the parameter identification system 502 can be used to obtain the system parameters of the controlled system, which can then be used to design and/or tune the controller prior to runtime. Once set, the tuning parameters may remain fixed after system startup unless it is decided to re-tune the system at a later time.

In other applications, some embodiments of the parameter identification system 502 can be configured to work with closed-loop control in order to perform online identification of system parameters during runtime of the system. In such embodiments, the parameter identification system 502 may be an integrated sub-system of the controller. Online identification of the system parameters may be performed by the parameter identification system 502 in response to initiation of a parameter identification sequence by the user (e.g., via a command entered via the interface component 516), or may be configured to automatically re-calculate the system parameters periodically or in response to a defined condition (e.g., at a time during which the system is not performing a critical operation). Updated system parameters obtained during such online identification sequences can then be used by an online tuning parameter estimation system to dynamically adjust the tuning parameter(s) after initial deployment of the system. In this way, the parameter identification system 502 can automatically compensate for gradual changes to the system's properties (e.g., as a result of mechanical wear and tear, changes to the load seen by a motor, etc.), which may result in changes in the system's overall dead time or other performance characteristics.

By combining rate-limited relay-based control with sinusoidal signal injection control, the parameter identification systems and methods described herein can yield more accurate system parameter estimations relative to techniques that use only relay-based identification or sinusoidal signal sweeping. Moreover, by rate-limiting the relay-based control stage, the identification technique ensures that the rate-limit constraint of the control application remains satisfied. Also, the parameter identification techniques described herein do not require derivation of a describing function relating the critical gain to the signal amplitude, and are therefore less computationally intrusive than systems that derive such describing functions in connection with identifying system parameter.

In various embodiments, the parameter identification system 502 may be embodied as a stand-alone system, or may be an integrated component of a control device (e.g., an industrial controller, a microcontroller, a motor drive, a system-on-chip, etc.). The parameter identification system 502 may also be embodied as a component of a controller program development platform; e.g., as a functional plug-in component of the development platform, as an instruction block included in a library of available function blocks for selection by a program developer, etc.

For configurations in which parameter estimation system is a separate system relative to the controller, any of components 505, 506, 508, 510, 512, 514, and 516 can exchange data with the controller or other elements of the control system via any suitable communications means, including but not limited to wired or wireless networking, hardwired data links, or other such communication means. In other embodiments, one or more of components 505, 506, 508, 510, 512, 514, and 516 can be integrated components of a controller (e.g., an industrial controller such as a programmable logic controller, a system-on-chip or other type of microcontroller, etc.). For example, one or more of components 505, 506, 508, 510, 512, 514, and 516 can be functional components of the controller's operating system and/or control software executed by one or more processors residing on the controller. Components 505, 506, 508, 510, 512, 514, and 516 can also be hardware components residing within the controller, such as a circuit board or integrated circuit, that exchanges data with other functional elements of the controller. In some embodiments, parameter identification system 502 may also be an integrated sub-system of a motor drive (e.g., a variable frequency drive or other motor drive). Other suitable implementations are also within the scope of certain embodiments of this disclosure.

Parameter identification system 502 can be used in connection with substantially any type of control application. Example motion control applications whose system parameters can be identified using system 502 include, but are not limited to, conveyor control systems, industrial robots (e.g., machining or material handling robots), industrial tooling systems, washing machines, conveyors, centrifuges, pumps, motorized hand tools, material handling systems, automotive systems (e.g., traction or propulsion systems of electric vehicles or other automotive systems), HVAC system components (e.g., fans, pumps, etc.), or other such motion control applications. Parameter identification system 502 can also be used to identify system parameters for substantially any type of process control application.

FIGS. 19A-19D illustrate a methodology in accordance with certain disclosed aspects. While, for purposes of simplicity of explanation, the methodology is shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

Figure 19A:
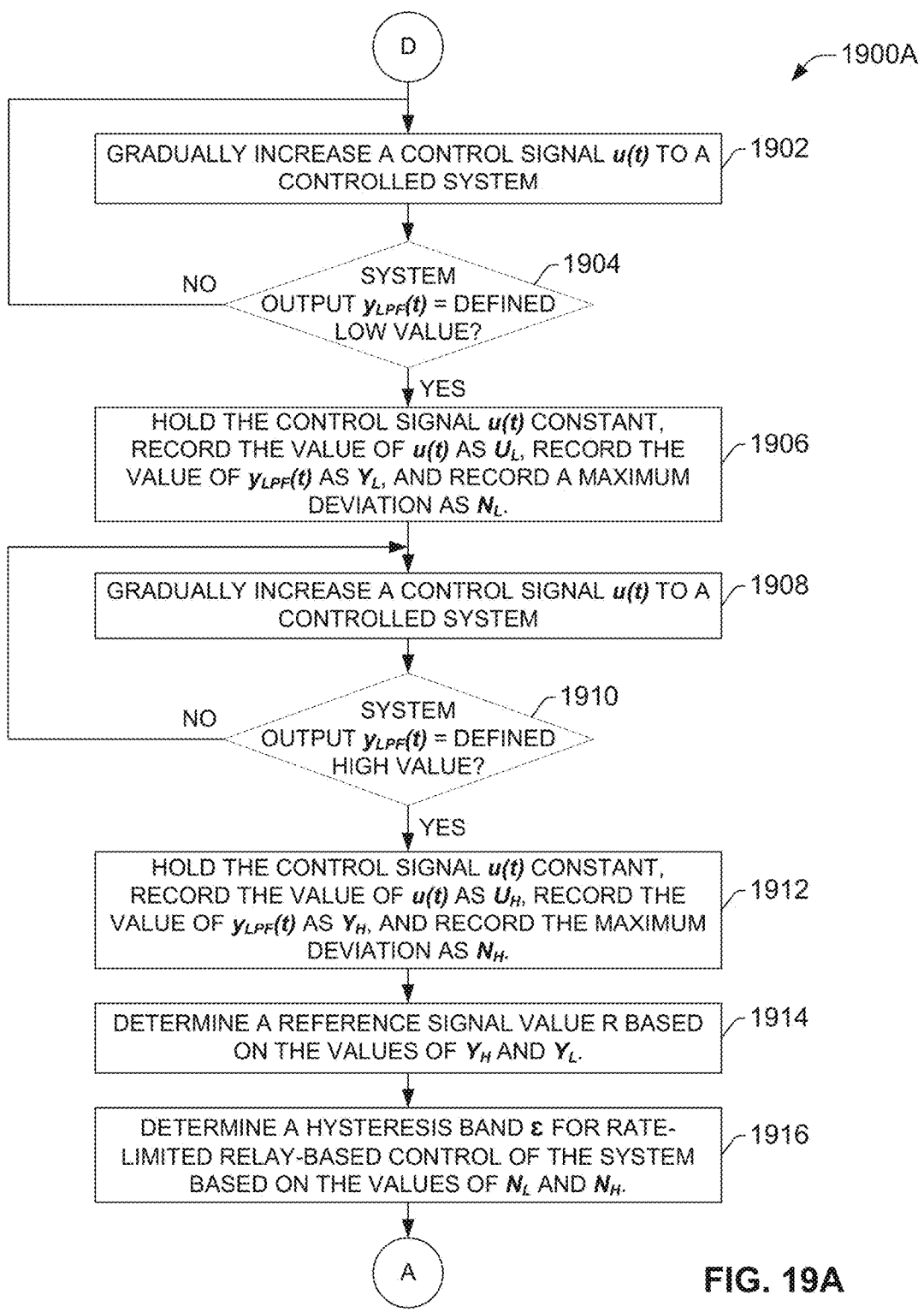
FIG. 19A is a first part of a flowchart of an example methodology for determining system parameters of a controlled mechanical system or industrial process.

FIG. 19A illustrates a first part 1900A of an example methodology for determining system parameters of a controlled mechanical system or industrial process. The first part 1900A of the methodology obtains configuration parameters for a rate-limited relay-based control stage. Initially, at 1902, a control signal u(t) to the controlled system (or process) is gradually increased from a predefined initial value. Depending on the type of control application, the control signal may be an analog voltage signal such as a 0-10 VDC signal, an analog current signal such as a 4-20 mA signal, a digital signal, a software instruction, or any other suitable type of control signal. At 1904, a determination is made as to whether the filtered output of the system $y_{LPF}(t)$ (that is, the filtered measured value of the controlled variable of the system or process, such as the speed or position of a mechanical system or value of a controlled process parameter) is greater than or equal to (or substantially equal to) a defined low value. In some embodiments, the defined low value of the system output may be 20% of the rated output of the system. If the filtered system output $y_{LPF}(t)$ has not reached the defined low value (NO at step 1904), the methodology continues to gradually increase the control signal at step 1902.

When the filtered system output $y_{LPF}(t)$ reaches the defined low level (YES at step 1906), the methodology proceeds to step 1906, where the control signal u(t) is held constant, and values of the control signal u(t) and the filtered system output $y_{LPF}(t)$ are recorded as $U_L$ and $Y_L$, respectively. A value of the maximum deviation of the filtered output signal $y_{LPF}(t)$ from a determined steady state value over a time duration as the output signal u(t) is held constant is also recorded as $N_L$.

With these values stored in memory, the methodology proceeds to step 1908, where the control signal is gradually increased again. At 1910, a determination is made as to whether the filtered system output $y_{LPF}(t)$ is equal to (or substantially equal to) a defined high value. In some embodiments, the defined high value of the system output may be 80% of the rated output of the system. If the filtered system output $y_{LPF}(t)$ has not reached the defined high value (NO at step 1910), the control signal continues to be gradually increased at step 1908. When the filtered system output $y_{LPF}(t)$ reaches the defined high level (YES at step 1910), the methodology proceeds to step 1912, where the control signal u(t) is held constant, and the values of the control signal u(t) and the filtered system output $y_{LPF}(t)$ are recorded as $U_H$ and $Y_H$, respectively. A value of the maximum deviation of the filtered output signal $y_{LPF}(t)$ from a determined steady state value over a time duration as the output signal u(t) is held constant is also recorded as $N_H$.

At 1914, a reference signal value R to be used for rate-limited relay-based control of the system is determined based on the values of $Y_H$ and $Y_L$. For example, the reference signal value R can be set to be a value midway between the high and low system output values $Y_H$ and $Y_L$ (e.g., as given by equation (2) above). At 1916, a hysteresis band ε for the rate-limited relay-based control of the system is determined based on the high and low maximum deviation values $N_H$ and $N_L$. For example, the hysteresis band ε can be selected as the maximum of $N_H$ or $N_L$, scaled by a predefined or user-selected tolerance factor.

Figure 19B:
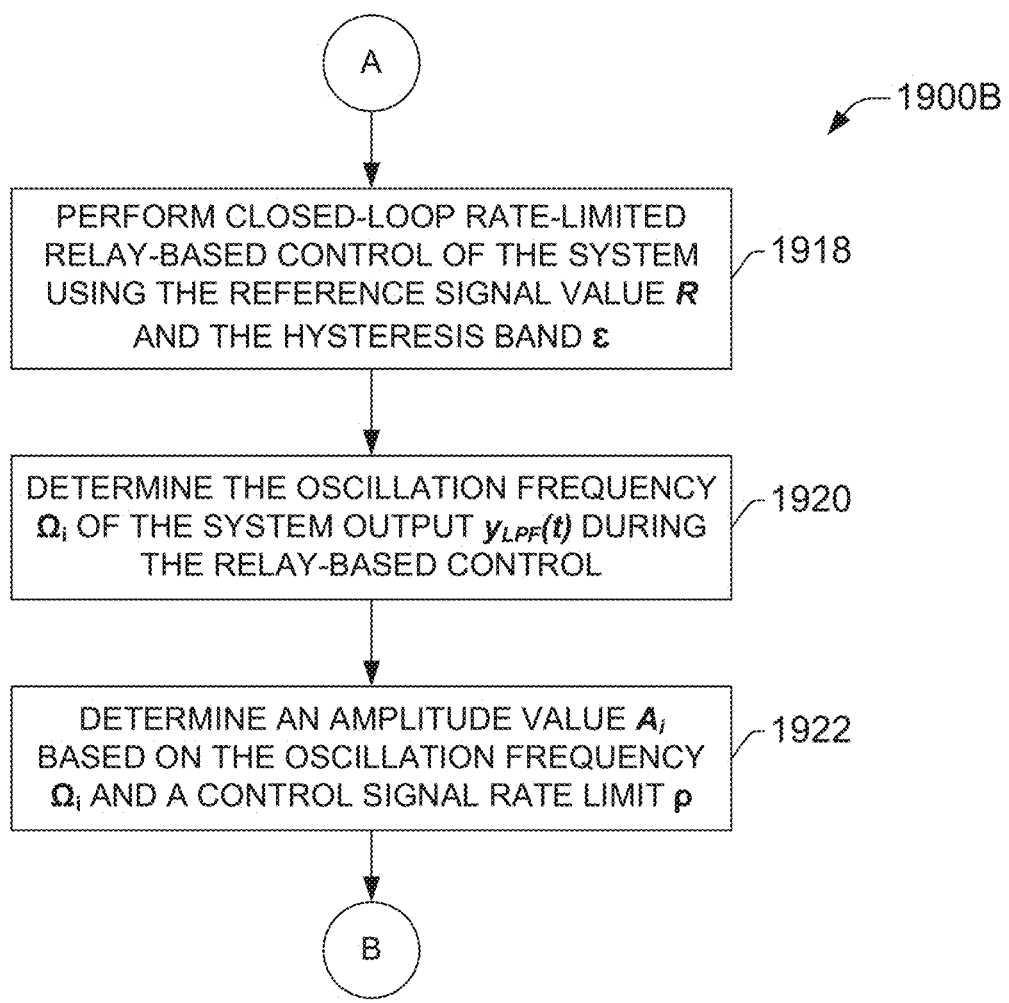
FIG. 19B is a second part of the flowchart of the example methodology for determining system parameters of a controlled mechanical system or industrial process.

The methodology then proceeds to the second part 1900B illustrated in FIG. 19B, during which rate-limited relay-based control is performed on the system. At 1918, closed-loop rate-limited relay-based control is performed on the system using the reference signal value R obtained at step 1914 and the hysteresis band ε obtained at step 1916. This relay-based control causes the system to oscillate. At 1920, as the system oscillates in response to the rate-limited relay-based control, the oscillation frequency of the filtered system output $y_{LPF}(t)$ is measured and stored as $\Omega_i$ (where i is an integer representing an execution count of methodology parts 1900B-1900C). At 1922, an amplitude value $A_i$ is determined based on the oscillation frequency $\Omega_i$ and a control signal rate limit ρ. For example, the amplitude value $A_i$ can be taken to be the smaller of the rate limit rate limit ρ divided by the oscillation frequency $\Omega_i$ signal or half of the range between the high and low control signal values $U_H$ and $U_L$ (as given by equation (5) above).

Figure 19C:
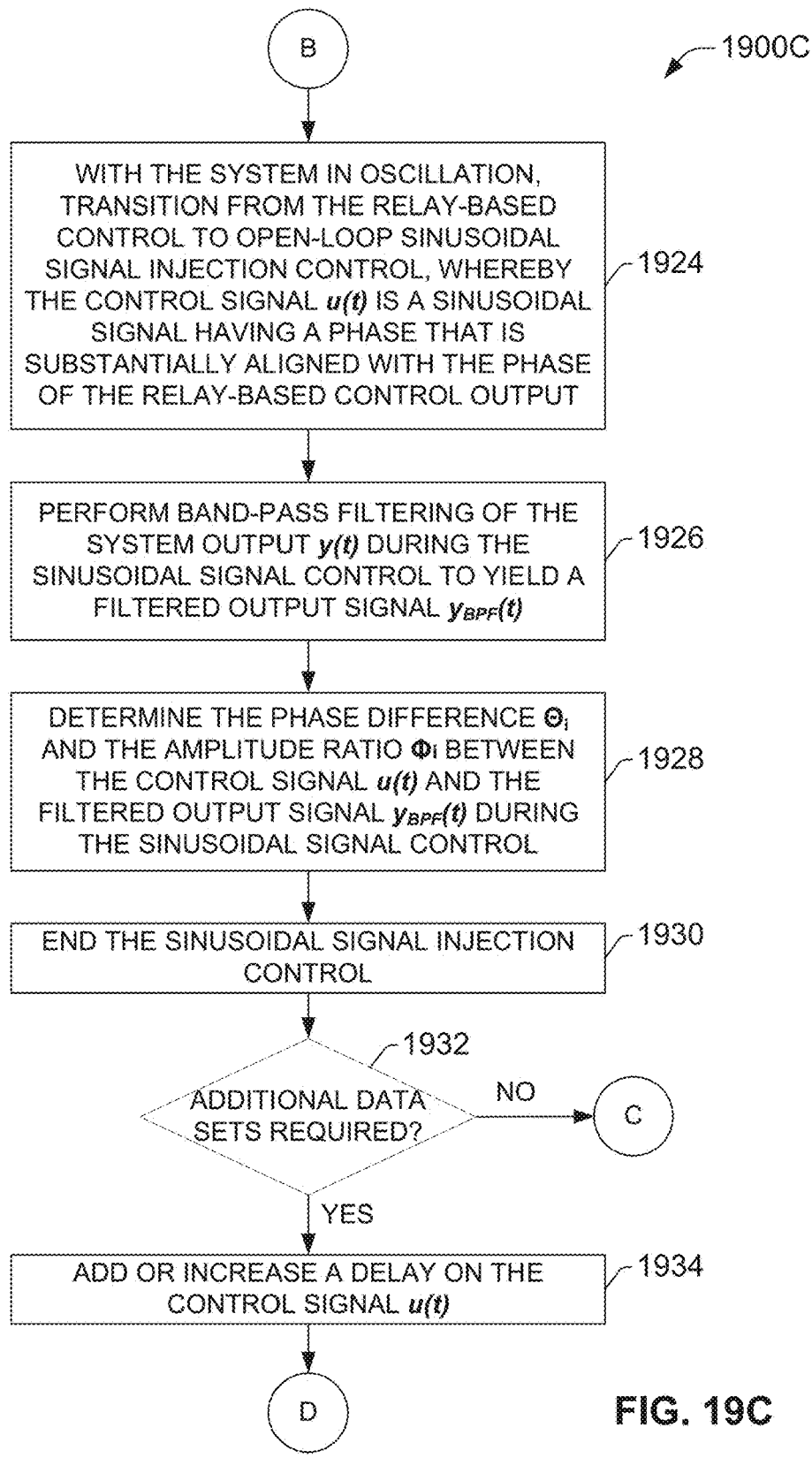
FIG. 19C is a third part of the flowchart of the example methodology for determining system parameters of a controlled mechanical system or industrial process.

The oscillation frequency $\Omega_i$ and amplitude value $A_i$ obtained during the second part 1900B of the methodology are used as parameters for sinusoidal signal injection control carried out during the third part 1900C illustrated in FIG. 19C. After the oscillation frequency $\Omega_i$ and amplitude value $A_i$ are obtained, the methodology proceeds to the third part 1900C of the methodology, where control is switched from the relay-based control to the sinusoidal signal injection control. At 1924, with the system still in oscillation as a result of the relay-based control performed during the second part 1900B of the methodology, control transitions from the relay-based control to open-loop sinusoidal signal injection control, whereby the control signal u(t) becomes a sinusoidal signal having a phase that is substantially aligned with the phase of the relay-based control output. To achieve this, the sinusoidal signal can be generated to have a frequency and amplitude based on the oscillation frequency $\Omega_i$ and amplitude value $A_i$ obtained at steps 1920 and 1922 (e.g., as given by equation (6) above).

At step 1926, as the sinusoidal signal injection control continues, bandpass filtering is performed on the output y(t) of the system to yield a filtered output signal $y_{BPF}(t)$. At 1928, the phase difference $\Theta_i$ and amplitude ratio $\Phi_i$ between the control signal u(t) and the filtered output signal $y_{BPF}(t)$ during the sinusoidal signal injection control is determined. At 1930, the sinusoidal signal injection control ends.

At 1932, a determination is made as to whether additional data sets are required. In some scenarios, additional data sets may be necessary for controlled systems having nth order plant models, where n is 2 or greater. Also, additional data sets may be desired regardless of the plant model in order to improve accuracy of the system parameter estimations through processing of multiple data sets.

If it is determined that additional data sets are required (YES at step 1932), the methodology proceeds to step 1934, where a delay or dead time $D_i$ is added to the control signal u(t) or, if a delay $D_i$ was already added for the previous execution of parts 1900B-1900C, the delay is increased (or otherwise changed to a different delay value). The methodology then returns to step 1904, and parts 1900B-1900C are repeated with delay $D_i$ applied to the control signal u(t) to obtain another data set. Parts 1900B-1900C can be repeated—with a different delay $D_i$ applied to the control signal for each execution—as many times as necessary to obtain a required or desired number of data sets.

Figure 19D:
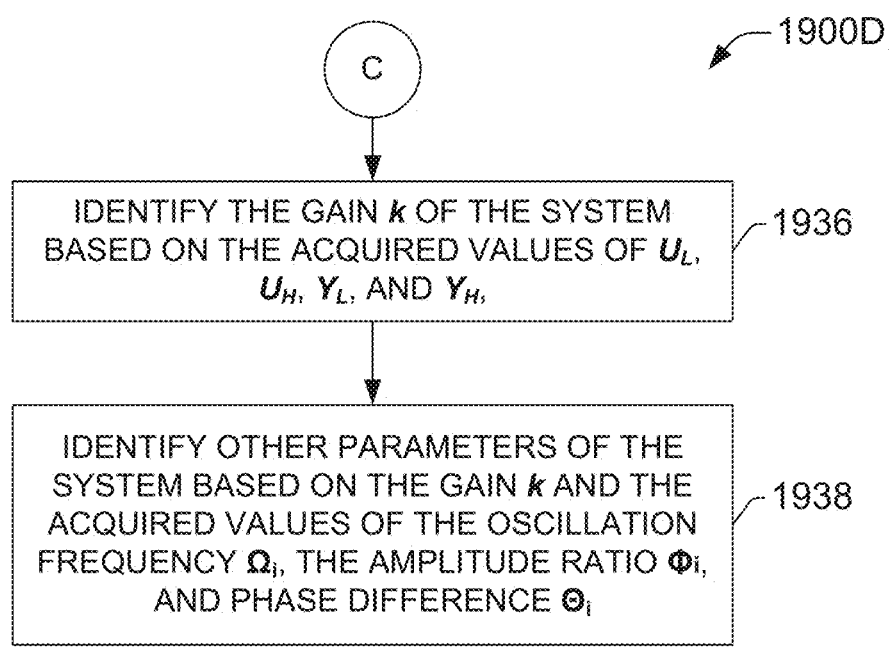
FIG. 19D is a fourth part of the flowchart of the example methodology for determining system parameters of a controlled mechanical system or industrial process.

If it is determined that additional data sets are not required (NO at step 1932), the methodology proceeds to the second part 1900D illustrated in FIG. 19D. At 1936, the gain k of the controlled system is determined based on the values of $U_L$, $U_H$, $Y_L$, and $Y_H$ acquired at steps 1906 and 1912 (e.g., using equation (7) above). At 1938, other parameters of the controlled system (e.g., one or more time constants $T_i$ and dead time D) are identified based on the gain obtained at step 1936, the value(s) of the oscillation frequency $\Omega_i$ determined at step 1920, the value(s) of the amplitude ratio $\Phi_i$ determined at step 1928, and the value(s) of the phase difference $\Theta_i$ obtained at step 1928. The calculations used to obtain the other system parameters can depend on the type of system (e.g. first-order-plus-dead-time, second-order-plus-dead-time, etc.). For example, for a FOPDT system, the time constant $T_1$ of the system can be determined based on equation (8) above, and the dead time D of the system can be determined based on equation (9). For a SOPDT system, the two time constants $T_1$ and $T_2$ of the system can be determined by solving equations (11) and (12), and the dead time D of the system can be determined based on equation (13).

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments of the parameter identification system described herein can be implemented in any computer system or environment having any number of memory or storage units (e.g., memory 520 of FIG. 5), and any number of applications and processes occurring across any number of storage units. This includes, but is not limited to, an environment with server computers and client computers deployed in a network environment or a distributed computing environment, having remote or local storage. For example, with reference to FIG. 5, the control signal generator 504, output monitoring component 506, relay parameter determination component 508, relay control and measurement component 510, sinusoidal control and measurement component 512, system parameter determination component 514, and interface component 516 can be stored on a single memory 520 associated with a single device, or can be distributed among multiple memories associated with respective multiple devices. Similarly, control signal generator 504, output monitoring component 506, relay parameter determination component 508, relay control and measurement component 510, sinusoidal control and measurement component 512, system parameter determination component 514, and interface component 516 can be executed by a single processor 518, or by multiple distributed processors associated with multiple devices.

Distributed computing provides sharing of computer resources and services by communicative exchange among computing devices and systems. These resources and services include the exchange of information, cache storage and disk storage for objects. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 20:
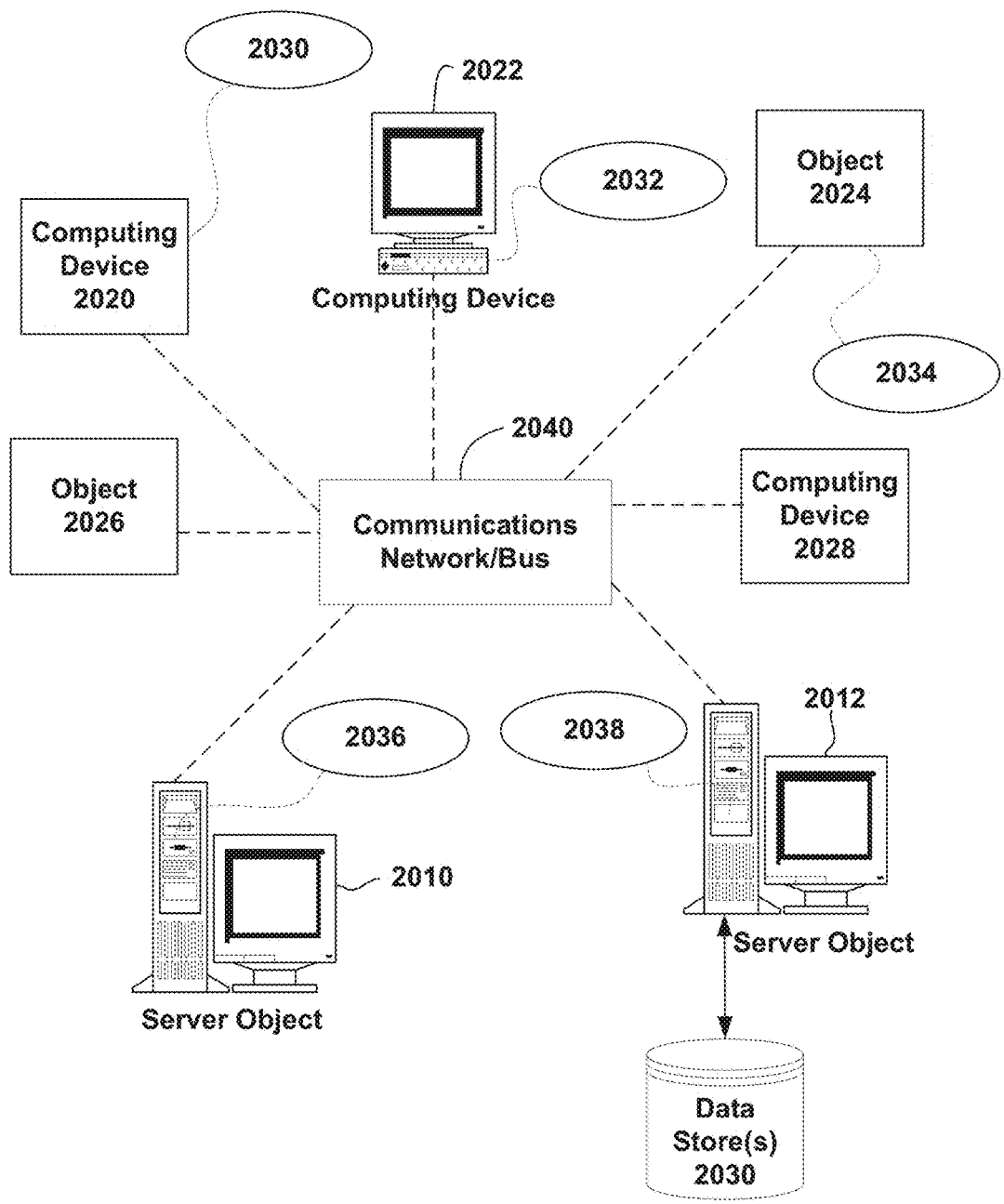
FIG. 20 is a block diagram representing an exemplary networked or distributed computing environment for implementing one or more embodiments described herein.

FIG. 20 provides a schematic diagram of an exemplary networked or distributed computing environment. The distributed computing environment includes computing objects 2010, 2012, etc. and computing objects or devices 2020, 2022, 2024, 2026, 2028, etc., which may include programs, methods, data stores, programmable logic, etc., as represented by applications 2030, 2032, 2034, 2036, 2038. It can be appreciated that computing objects 2010, 2012, etc. and computing objects or devices 2020, 2022, 2024, 2026, 2028, etc. may comprise different devices, such as personal digital assistants (PDAs), audio/video devices, mobile phones, MP3 players, personal computers, laptops, tablets, etc., where embodiments of the inertia estimator described herein may reside on or interact with such devices.

Each computing object 2010, 2012, etc. and computing objects or devices 2020, 2022, 2024, 2026, 2028, etc. can communicate with one or more other computing objects 2010, 2012, etc. and computing objects or devices 2020, 2022, 2024, 2026, 2028, etc. by way of the communications network 2040, either directly or indirectly. Even though illustrated as a single element in FIG. 20, communications network 2040 may comprise other computing objects and computing devices that provide services to the system of FIG. 20, and/or may represent multiple interconnected networks, which are not shown. Each computing object 2010, 2012, etc. or computing objects or devices 2020, 2022, 2024, 2026, 2028, etc. can also contain an application, such as applications 2030, 2032, 2034, 2036, 2038 (e.g., parameter identification system 502 or components thereof), that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 20, as a non-limiting example, computing objects or devices 2020, 2022, 2024, 2026, 2028, etc. can be thought of as clients and computing objects 2010, 2012, etc. can be thought of as servers where computing objects 2010, 2012, etc. provide data services, such as receiving data from client computing objects or devices 2020, 2022, 2024, 2026, 2028, etc., storing of data, processing of data, transmitting data to client computing objects or devices 2020, 2022, 2024, 2026, 2028, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 2040 is the Internet, for example, the computing objects 2010, 2012, etc. can be Web servers, file servers, media servers, etc. with which the client computing objects or devices 2020, 2022, 2024, 2026, 2028, etc. communicate via any of a number of known protocols, such as the hypertext transfer protocol (HTTP). Computing objects 2010, 2012, etc. may also serve as client computing objects or devices 2020, 2022, 2024, 2026, 2028, etc., as may be characteristic of a distributed computing environment.

Exemplary Computing Device

Figure 21:
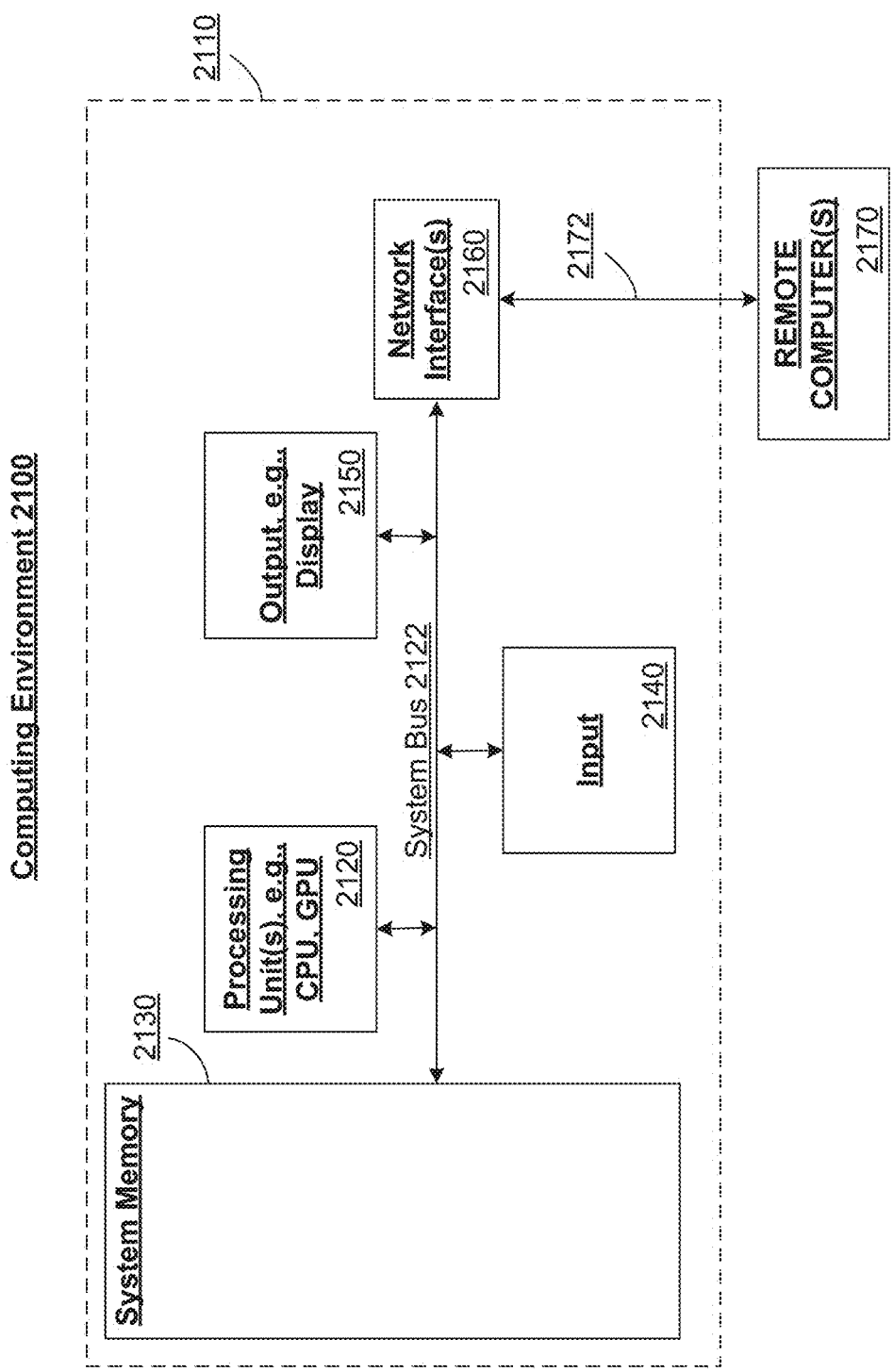
FIG. 21 is a block diagram representing an exemplary computing system or operating environment for implementing one or more embodiments described herein.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 21 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 21 thus illustrates an example of a suitable computing system environment 2100 in which one or aspects of the embodiments described herein can be implemented, although as made clear above, the computing system environment 2100 is only one example of a suitable computing environment and is not intended to suggest any limitation as to scope of use or functionality. Neither is the computing system environment 2100 be interpreted as having any dependency or requirement relating to any one or combination of components illustrated in the exemplary computing system environment 2100.

With reference to FIG. 21, an exemplary computing device for implementing one or more embodiments in the form of a computer 2110 is depicted. Components of computer 2110 may include, but are not limited to, a processing unit 2120, a system memory 2130, and a system bus 2122 that couples various system components including the system memory to the processing unit 2120. Processing unit 2120 may, for example, perform functions associated with processor(s) 518 of parameter identification system 502, while system memory 2130 may perform functions associated with memory 520.

Computer 2110 typically includes a variety of computer readable media and can be any available media that can be accessed by computer 2110. The system memory 2130 may include computer storage media in the form of volatile and/or nonvolatile memory such as read only memory (ROM) and/or random access memory (RAM). By way of example, and not limitation, system memory 2130 may also include an operating system, application programs, other program modules, and program data.

A user can enter commands and information into the computer 2110 through input devices 2140, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 2110. A monitor or other type of display device is also connected to the system bus 2122 via an interface, such as output interface 2150. In addition to a monitor, computers can also include other peripheral output devices such as speakers and a printer, which may be connected through output interface 2150. In one or more embodiments, input devices 2140 can provide user input to interface component 516, while output interface 2150 can receive information relating to operations of the parameter identification system 502 from interface component 516.

The computer 2110 may operate in a networked or distributed environment using logical connections to one or more other remote computers, such as remote computer 2170. The remote computer 2170 may be a personal computer, a server, a router, a network PC, a peer device or other common network node, or any other remote media consumption or transmission device, and may include any or all of the elements described above relative to the computer 2110. The logical connections depicted in FIG. 18 include a network 2172, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media (e.g., memory 520) and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in any inferences described herein, components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

In view of the exemplary systems described above, methodologies that may be implemented in accordance with the described subject matter will be better appreciated with reference to the flowcharts of the various figures (e.g., FIGS. 19A-19D). While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A parameter identification system, comprising:
a memory; and
a processor configured to execute components stored on the memory, the components comprising:
   a control signal generator configured to generate a control signal directed to a controlled system;
   an output monitoring component configured to monitor an output signal of the controlled system, the output signal representing a variable of the controlled system controlled by the control signal;
   a relay control and measurement component configured to output the control signal in accordance with rate-limited relay-based control of the controlled system, wherein the rate-limited relay-based control causes the control signal to oscillate at a first phase;
   a sinusoidal control and measurement component configured to, in response to a determination that the output signal is in oscillation during the rate-limited relay-based control, stop the rate-limited relay-based control and initiate open-loop sinusoidal signal injection control of the controlled system, whereby the control signal is a sinusoidal signal having a second phase that is substantially aligned with the first phase; and a system parameter determination component configured to determine one or more system parameters of the controlled system based on a data set obtained via measurement of the control signal and the output signal during the rate-limited relay based control and the open-loop sinusoidal signal injection control.

2. The parameter identification system of claim 1, wherein the one or more system parameters comprise at least one of a gain of the controlled system, one or more time constants of the controlled system, or a dead time of the controlled system.

3. The parameter identification system of claim 1, wherein the data set comprises at least one of an oscillation frequency of the output signal measured during the rate-limited relay-based control, a ratio between a first amplitude of the control signal and a second amplitude of the output signal measured during the open-loop sinusoidal signal injection control, and a phase difference between the control signal and the output signal measured during the open-loop sinusoidal signal injection control.

4. The parameter identification system of claim 1, wherein the output monitoring component is further configured to perform low-pass filtering on the output signal to yield a filtered output signal, and the parameter identification system further comprises a relay parameter determination component configured to set a hysteresis band for the rate-limited relay-based control based on a measured maximum deviation of the filtered output signal from a steady state value of the filtered output signal as the control signal is held at a constant level.

5. The parameter identification system of claim 4, wherein the relay parameter determination component is further configured to set a reference signal value for the rate-limited relay-based control to be a value midway or approximately midway between a first value of the filtered output signal corresponding to approximately 20% of a rated output of the controlled system and a second value of the filtered output signal corresponding to approximately 80% of the rated output.

6. The parameter identification system of claim 1, wherein the relay control and measurement component is configured to measure an oscillation frequency of the output signal during the rate-limited relay-based control, and the sinusoidal control and measurement component is configured to set an amplitude of the sinusoidal signal based on the oscillation frequency and a defined control signal rate limit.

7. The parameter identification system of claim 6, wherein the sinusoidal control and measurement component is configured to set a frequency of the sinusoidal signal to be a multiple of the oscillation frequency.

8. The parameter identification system of claim 1, wherein the relay control and measurement component and the sinusoidal control and measurement component are configured to perform multiple executions of the rate-limited relay-based control and the sinusoidal signal injection control to yield multiple data sets, and the multiple executions are performed with respective different amounts of delay added to the control signal.

9. The system of claim 1, wherein the parameter identification system is at least one of an integrated component of an industrial controller, an integrated component of a motor drive, an integrated component of a microcontroller, or a system-on-chip.

10. A method, comprising:

outputting, by a system comprising at least one processor as a first stage of a parameter identification sequence, a control signal to a controlled system as a rate-limited relay-based control output, wherein the outputting produces an oscillation of an output signal of the controlled system at a first phase;

in response to a determination that the output signal is in oscillation during the relay-based control stage, outputting, by the system as a second stage of the parameter identification sequence, the control signal to the controlled system as an open-loop sinusoidal control output having a second phase that is substantially aligned with the first phase; and determining, by the system, one or more system parameters of the controlled system based on a data set obtained via measurement of the control signal and the output signal during the first stage and the second stage.

11. The method of claim 10, wherein the determining comprises determining, as the one or more system parameters, at least one of a gain of the controlled system, one or more time constants of the controlled system, or a dead time of the controlled system.

12. The method of claim 10, further comprising:

determining, by the system as the data set, at least one of an oscillation frequency of the output signal measured during the first stage, a ratio between a first amplitude of the control signal and a second amplitude of the output signal measured during the second stage, and a phase difference between the control signal and the output signal measured during the second stage.

13. The method of claim 10, further comprising:

outputting, by the system, the control signal to the controlled system as a constant signal value for a test duration;

low-pass filtering the output signal to yield a filtered output signal;

measuring, by the system, a maximum deviation of the filtered output signal from a determined steady state value of the filtered output signal over the test duration; and setting, by the system, a hysteresis band for the rate-limited relay-based control output based on the maximum deviation.

14. The method of claim 13, further comprising setting, by the system, a reference signal value for the rate-limited relay-based control output to be a value midway or approximately midway between a first value of the filtered output signal corresponding to approximately 20% of a rated output of the controlled system and a second value of the filtered output signal corresponding to approximately 80% of the rated output.

15. The method of claim 10, further comprising:

measuring, by the system, an oscillation frequency of the output signal during the first stage; and setting, by the system, an amplitude of the open-loop sinusoidal control output based on the oscillation frequency and a defined control signal rate limit.

16. The method of claim 15, further comprising setting, by the system, a frequency of the open-loop sinusoidal control output to be a multiple of the oscillation frequency.

17. The method of claim 10, further comprising performing multiple executions of the first stage and the second stage to yield multiple data sets, wherein the performing comprises performing the multiple executions with respective different amounts of dead time added to the control signal.

18. A non-transitory computer-readable medium having stored thereon executable components that, in response to execution by a system comprising a processor, cause the system to perform operations, the operations comprising:
performing rate-limited relay-based control of a controlled system, comprising outputting a control signal to the controlled system as a rate-limited relay-based control output, wherein the outputting produces an oscillation of an output signal of the controlled system at a first phase;
in response to a determination that the output signal is in oscillation during the rate-limited relay-based control stage, performing open-loop sinusoidal signal injection control of the controlled system, comprising outputting the control signal to the controlled system as a sinusoidal control output having a second phase that is substantially aligned with the first phase; and
determining one or more system parameters of the controlled system based on a data set obtained via measurement of the control signal and the output signal during the rate-limited relay-based control and the open-loop sinusoidal signal injection control.

19. The non-transitory computer-readable medium of claim 18, wherein the determining comprises determining, as the one or more system parameters, at least one of a gain of the controlled system, one or more time constants of the controlled system, or a dead time of the controlled system.

20. The non-transitory computer-readable medium of claim 18, wherein the data set comprises at least an oscillation frequency of the output signal measured during the rate-limited relay-based control, a ratio between a first amplitude of the control signal and a second amplitude of the output signal measured during the open-loop sinusoidal signal injection control, and a phase difference between the control signal and the output signal during the open-loop sinusoidal signal injection control.

* * * * *

UNITED STATES PATENT AND TRADEMARK OFFICE
CERTIFICATE OF CORRECTION

PATENT NO. : 10,386,808 B2
APPLICATION NO. : 15/441482
DATED : August 20, 2019
INVENTOR(S) : Tian et al.

Page 1 of 1

It is certified that error appears in the above-identified patent and that said Letters Patent is hereby corrected as shown below:

On the Title Page

Item (54) and in the Specification, Column 1, Lines 1-4:
SYSTEM PARAMETER IDENTIFICATINO METHOD BASED ON RATE-LIMITED RELAY WITH HYSTERESIS AND SINUSOIDAL INJECTION It should read:
SYSTEM PARAMETER IDENTIFICATION METHOD BASED ON RATE-LIMITED RELAY WITH HYSTERESIS AND SINUSOIDAL INJECTION Signed and Sealed this
Twenty-fourth Day of September, 2019

Andrei Iancu
*Director of the United States Patent and Trademark Office*